United States Patent [19]
Kaplow et al.

[11] Patent Number: 5,542,013
[45] Date of Patent: Jul. 30, 1996

[54] OPTICAL FIBER CONNECTOR BYPASS DEVICE

[75] Inventors: Wesley K. Kaplow, Troy, N.Y.;
Richard J. Pimpinella, Hampton, N.J.

[73] Assignee: AT&T Corp., Murray Hill, N.J.

[21] Appl. No.: 451,695

[22] Filed: May 26, 1995

Related U.S. Application Data

[63] Continuation of Ser. No. 174,993, Dec. 29, 1993, Pat. No. 5,440,655.

[51] Int. Cl.$^6$ .............................. G02B 6/34; G02B 6/36
[52] U.S. Cl. ................. 385/25; 385/16; 385/24; 385/36; 385/70; 385/71; 385/73; 385/65; 385/18
[58] Field of Search .................. 385/16, 17, 18, 385/24, 25, 27, 32, 36, 35, 46, 47, 65, 48, 70, 73, 71, 83, 76, 77, 139

[56] References Cited

U.S. PATENT DOCUMENTS

| | | | |
|---|---|---|---|
| 4,874,218 | 10/1989 | Bowen et al. | 385/25 X |
| 4,927,225 | 5/1990 | Levinson | 385/24 X |
| 4,995,694 | 2/1991 | Rieger et al. | 385/24 X |
| 5,004,318 | 4/1991 | Ohashi | 385/25 X |
| 5,028,104 | 7/1991 | Kokoshvili | 385/25 X |
| 5,080,461 | 1/1992 | Pimpinella | 385/65 |
| 5,090,791 | 2/1992 | Kidder et al. | 385/24 |
| 5,127,067 | 6/1992 | Delcoco et al. | 385/47 |
| 5,175,780 | 12/1992 | Sano et al. | 385/47 |
| 5,257,332 | 10/1993 | Pimpinella | 385/59 |
| 5,440,655 | 8/1995 | Kaplow et al. | 385/25 |

*Primary Examiner*—Brian Healy

[57] ABSTRACT

A method and apparatus for changing the path of an optical signal are disclosed. An optical bypass device having an optical input and output, and a waveguiding region optically connecting the input and output, is used to form a multiplicity of improved connectors and switches. In a first embodiment of the device, the waveguiding region comprises a plurality of reflective surfaces. In a second embodiment, the waveguiding region comprises a core of optically suitable material and a layer of cladding, where the relationship between the refractive index of the core and cladding is such that an optical signal may be guided by the core. The optical bypass device is integrated, with and without actuating means, into various connectors to provide loopback of an optical signal when a connector is demated.

10 Claims, 22 Drawing Sheets

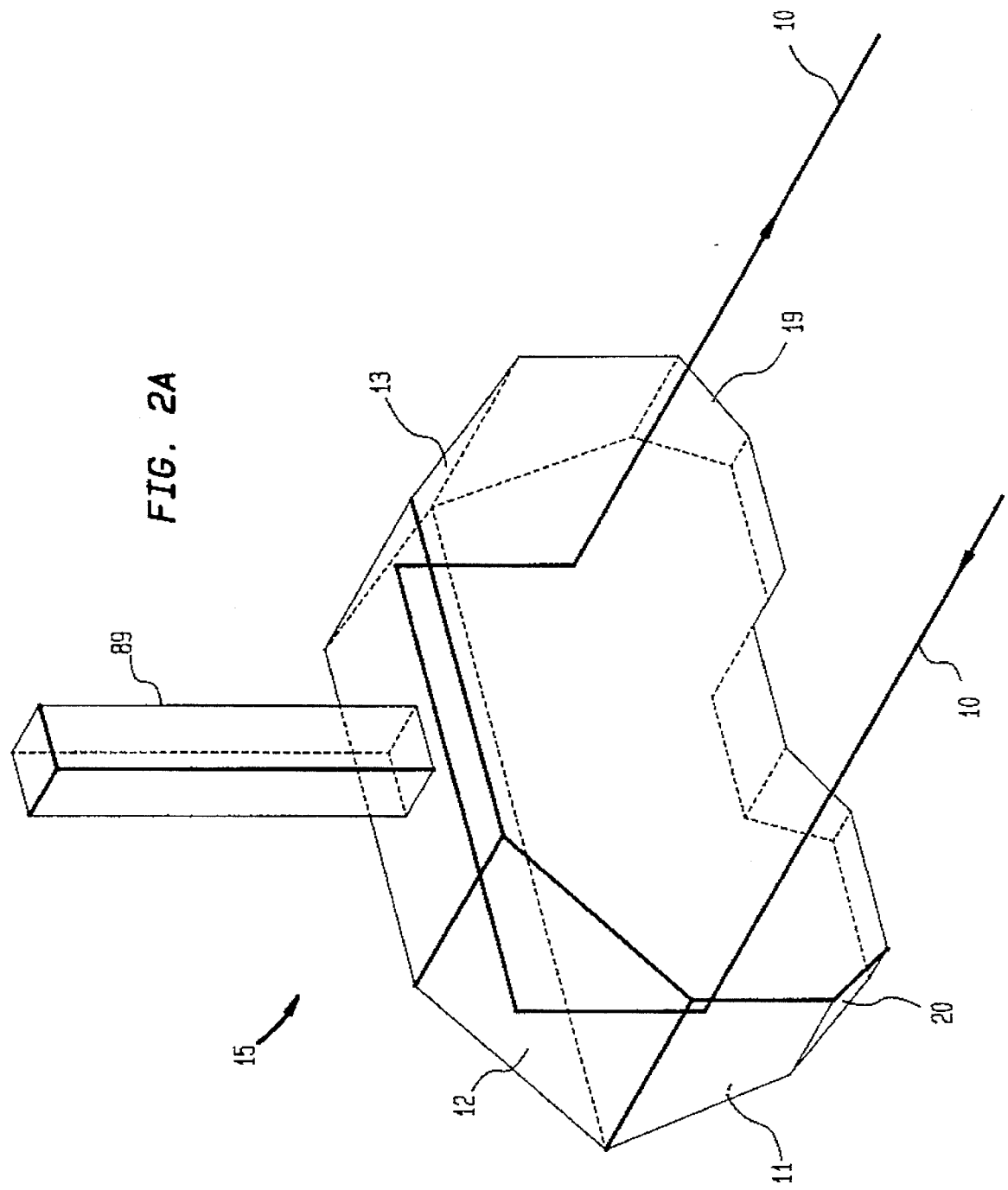

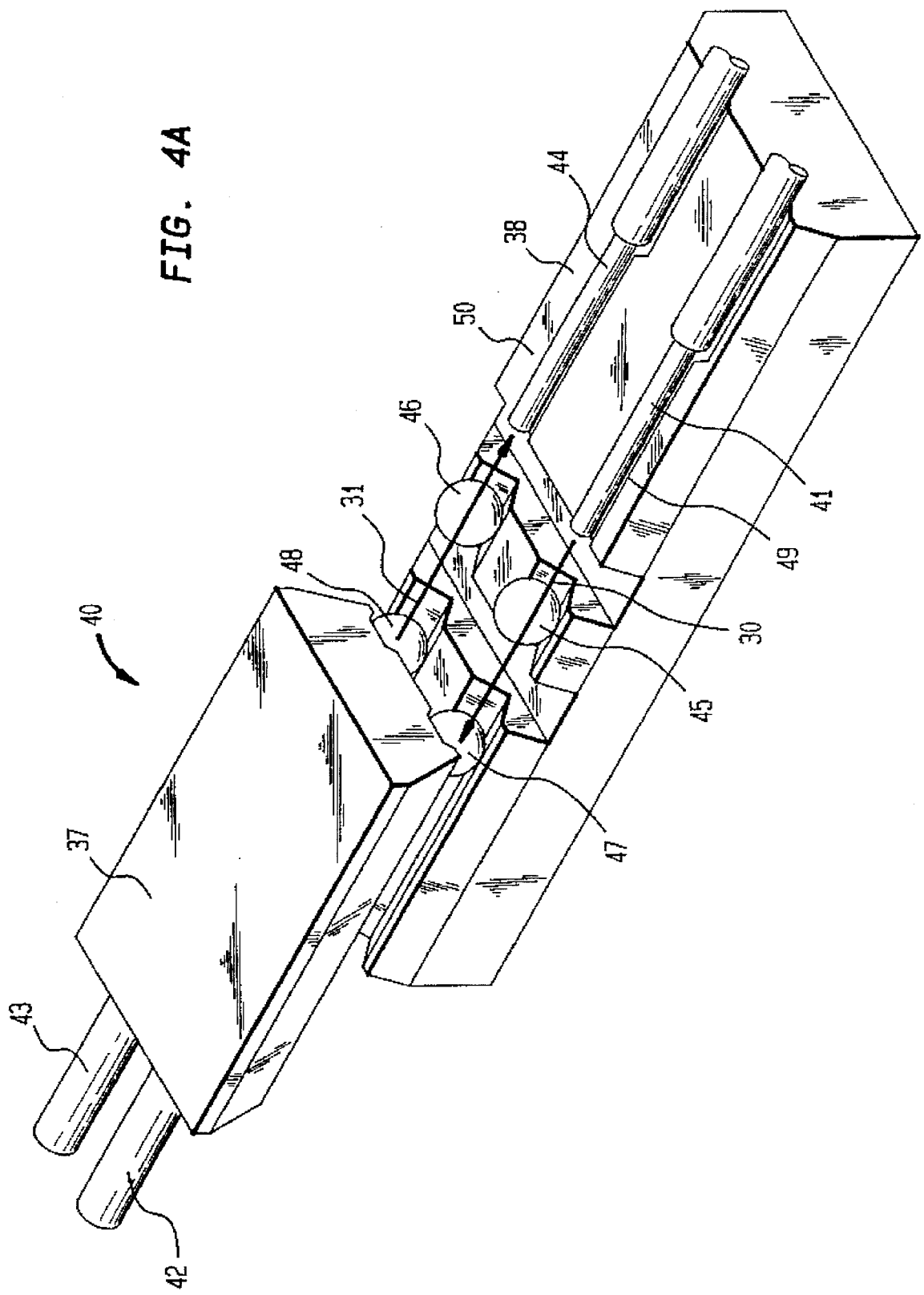

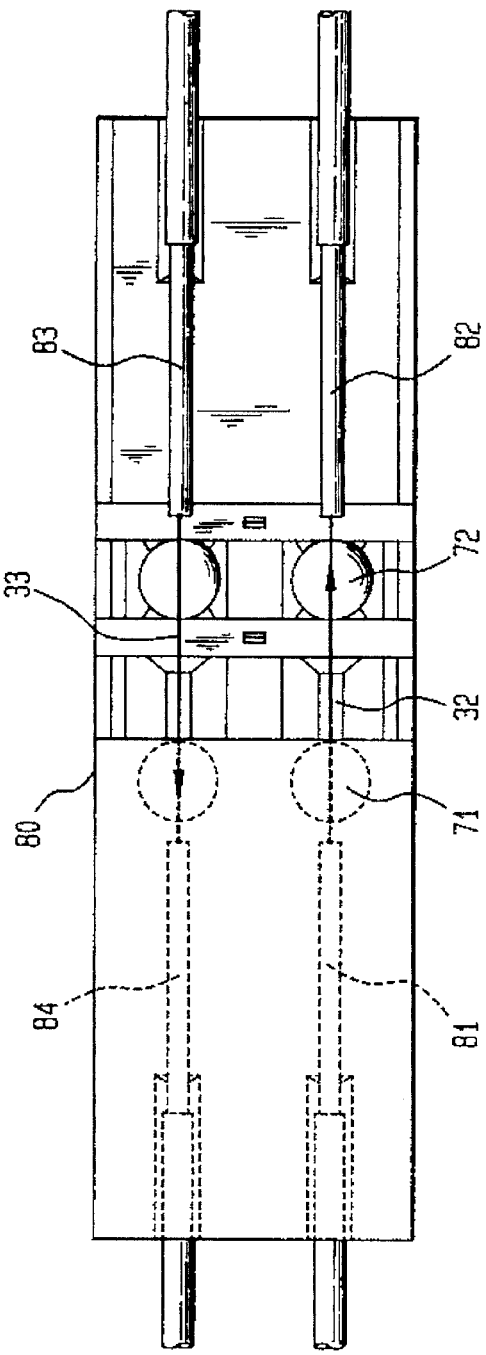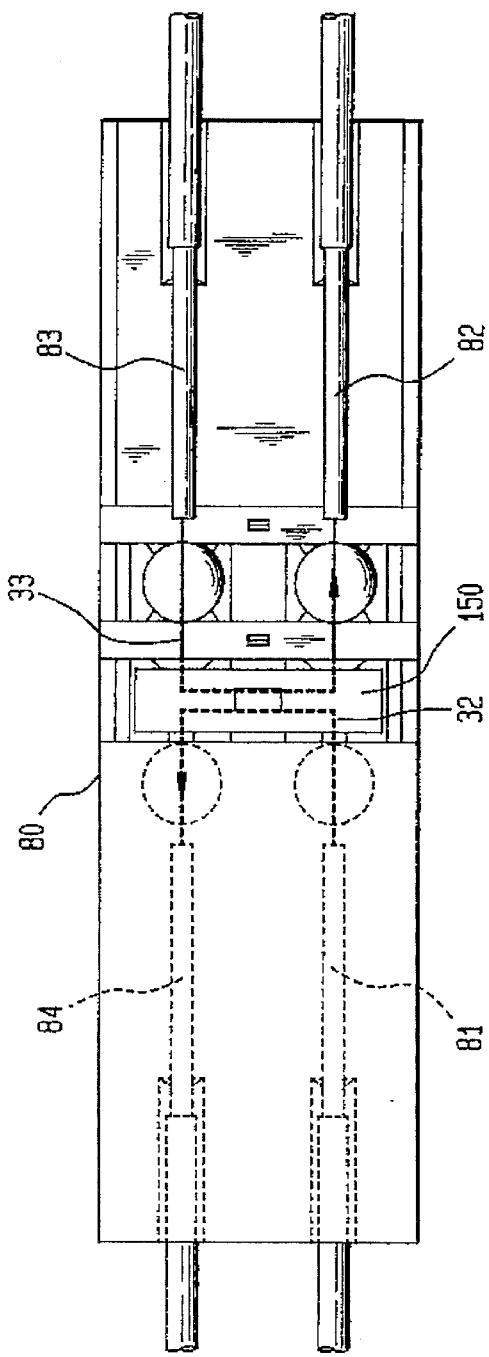

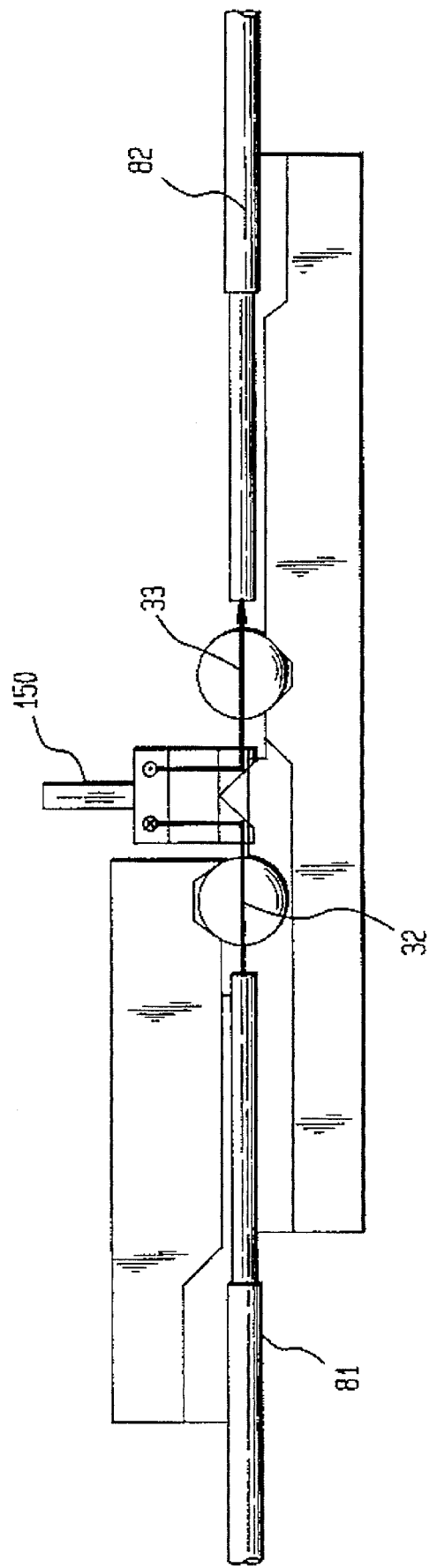

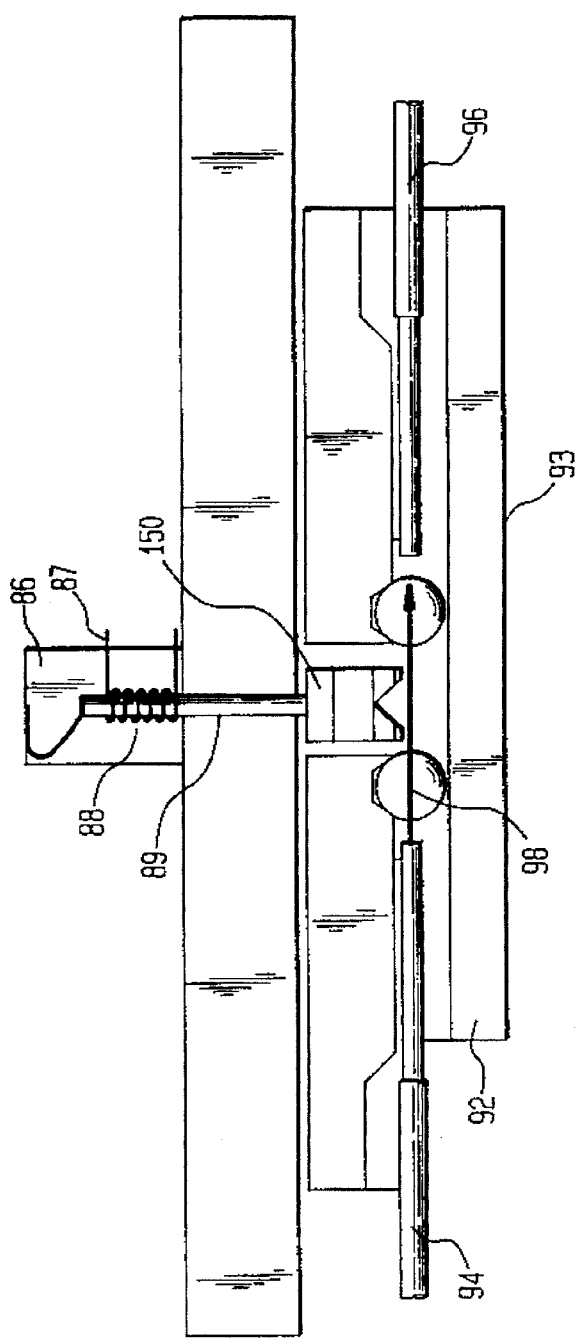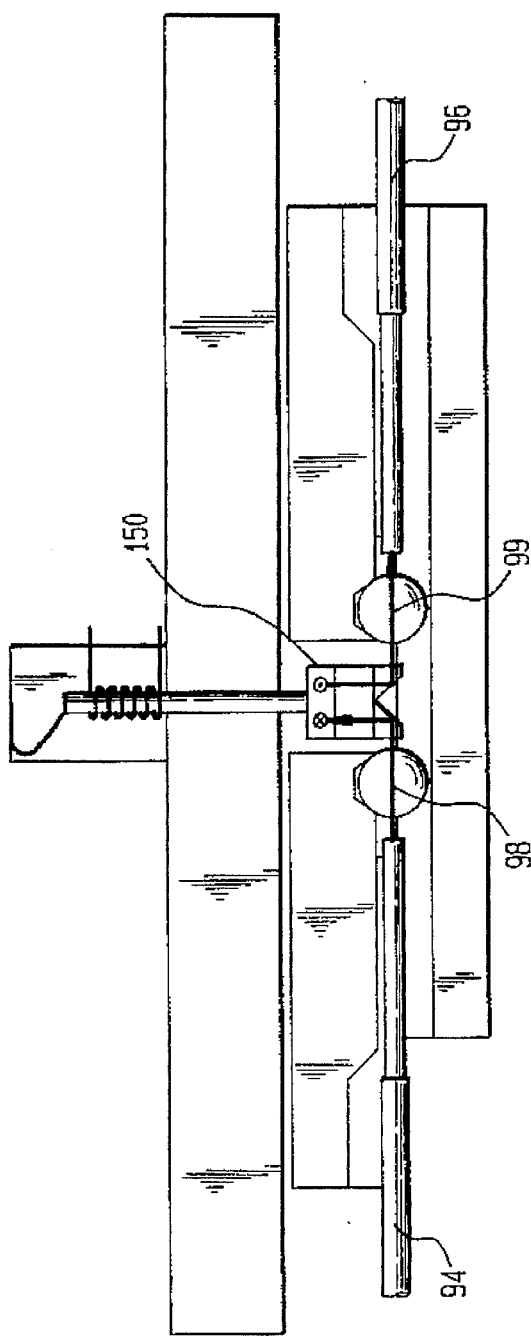
FIG. 12
FIG. 13

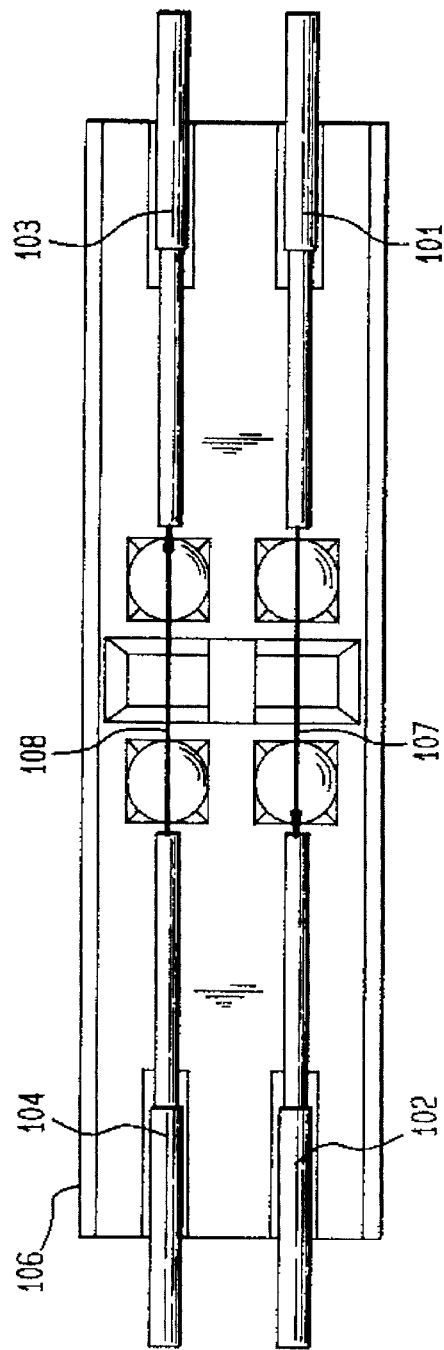
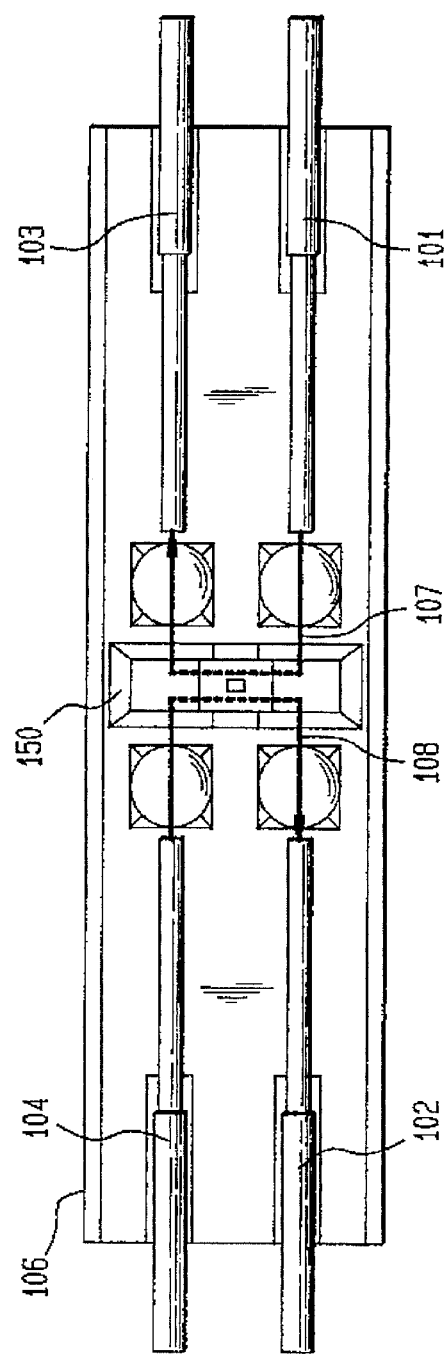
FIG. 14A
FIG. 14B

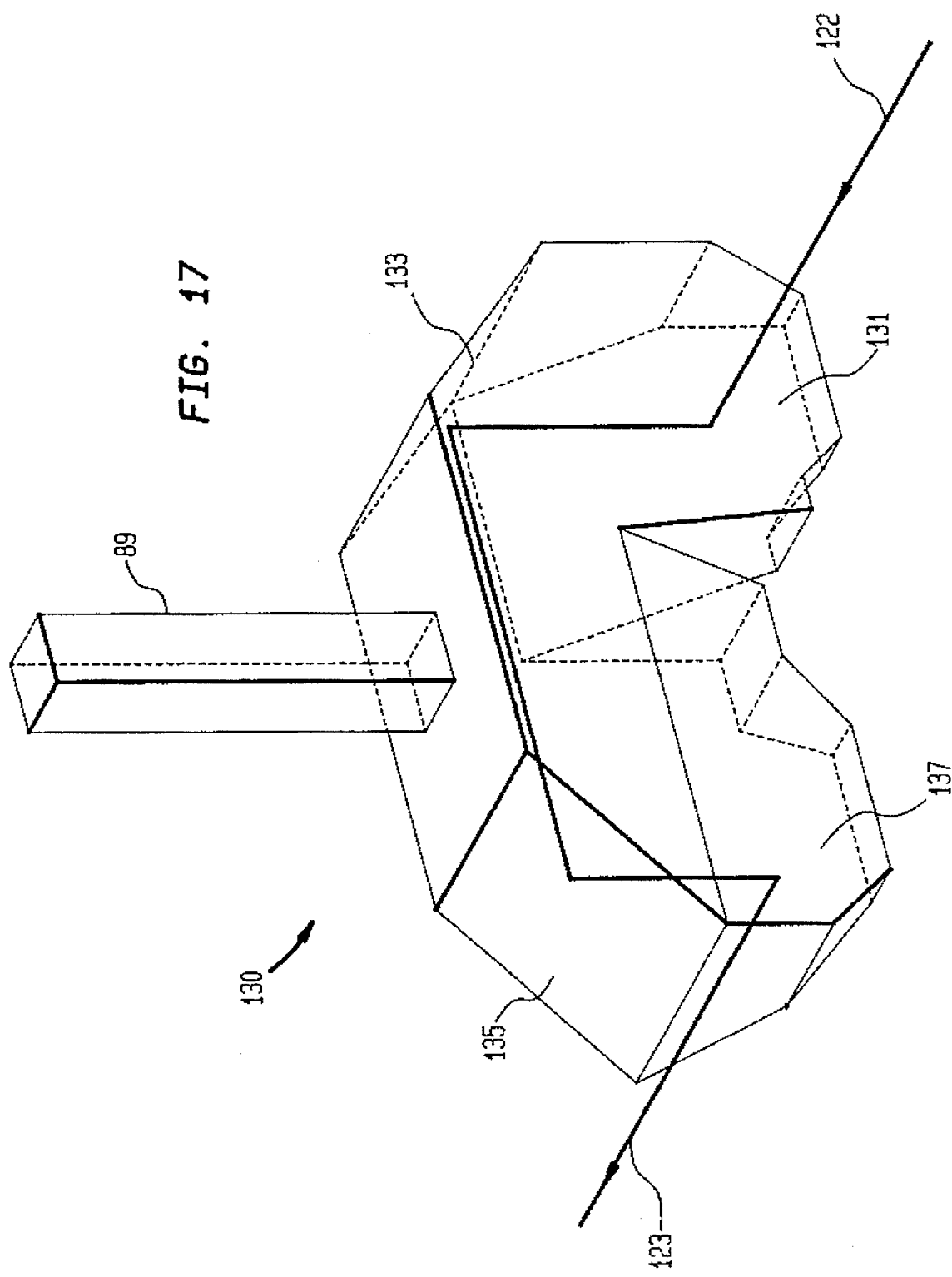

5,542,013

OPTICAL FIBER CONNECTOR BYPASS DEVICE

This is a continuation of copending application Ser. No. 08/174,993 filed on Dec. 29, 1993, now U.S. Pat. No. 5,440,655

FIELD OF THE INVENTION

This invention relates generally to improved optical fiber connectors and optical path switches, and more particularly to more compact versions of optical path switches.

BACKGROUND OF THE INVENTION

Fiber-optic systems are varied in nature, with many supporting multiterminal distribution systems. One such multiterminal system architecture is known as a ring structure or network. The ring configuration is typically a closed path wherein terminals (nodes) are connected by a series of point-to-point fiber links. A characteristic of a ring network is that it requires continuity of the ring for operation. If a node fails, or is physically disconnected from the ring, then the network is no longer operational. In such a case, the optical path must be rerouted to bypass this node.

Prior art methods for changing an optical path include moving fiber switches and moving mirror switches. Moving fiber switches alter an optical path by physically repositioning a fiber by electrical, magnetic or mechanical means. Moving mirror switches typically utilize a single reflective surface to redirect a light beam. When the reflective surface is out of the optical path, the light beam proceeds along a first path. When inserted into the optical path, the reflective surface redirects the light to a second path, typically oriented at 90° to the first path. Both moving mirror and moving fiber switches are dedicated switches. These devices are not readily suitable for use in conjunction with connectors. Further, a moving mirror switch must be precisely positioned in free space to ensure that upon reflection, the optical beam is directed to the appropriate fiber with minimal insertion loss.

Accordingly, there is a need for a means to accomplish a switching function which may be incorporated directly into connectors to maintain network continuity when the connectors are disconnected.

SUMMARY OF THE INVENTION

The foregoing problems are solved and an advance is achieved by the present invention. This invention is described below by illustrative embodiments of an optical bypass device which may be incorporated into a number of different types of connectors to provide network continuity as well as a switching function. In a first embodiment of the optical bypass device, a plurality of reflective surfaces are configured to redirect the path of one or more input optical beams.

In a second embodiment of the device, optically suitable waveguiding material is used to redirect the path of one or more input optical beams.

BRIEF DESCRIPTION OF THE DRAWINGS

Further features of the invention will become more apparent from the following detailed description of specific embodiments thereof when read in conjunction with the accompanying drawings, in which like elements have like reference numerals and in which;

FIG. 2a is a perspective view of an embodiment of an optical bypass device according to the present invention;

FIG. 4a is a perspective view of an improved connector which may be used to connect a circuit pack to a circuit pack enclosure, and shows the cross state of the connector;

FIG. 8a is a plan-view illustrating an improved FDDI compatible bypass connector according to the present invention, and showing the cross state of the connector;

FIG. 8b is a plan-view of the apparatus of FIG. 8a, showing the bar state of the connector due to the presence of the bypass device in the signal path;

FIG. 8c is a side-view of the apparatus shown in FIG. 8b showing the optical bypass device in the inserted position;

FIG. 9b is a side-view of the apparatus shown in FIG. 9a;

FIG. 12 shows the elements of FIG. 11 assembled to create an improved connector coupler with a 2×2 optical bypass function with the optical bypass device shown in the retracted position;

FIG. 13 is the apparatus of FIG. 12 with the optical bypass device in the inserted position;

FIG. 14a is an illustration of a standalone 2×2 optical bypass switch according to the present invention showing the switch in the cross state;

FIG. 14b shows the apparatus of FIG. 14a with the optical bypass device in the inserted position placing the switch in a bar state;

FIG. 17 is a perspective view of an optical bypass device according to the present invention adapted to implement a selection switch or a protection line switch;

FIG. 18b is a cross-sectional view of the optical bypass device illustrated in FIGS. 17 and 18a;

DETAILED DESCRIPTION OF THE INVENTION

Figure 1:
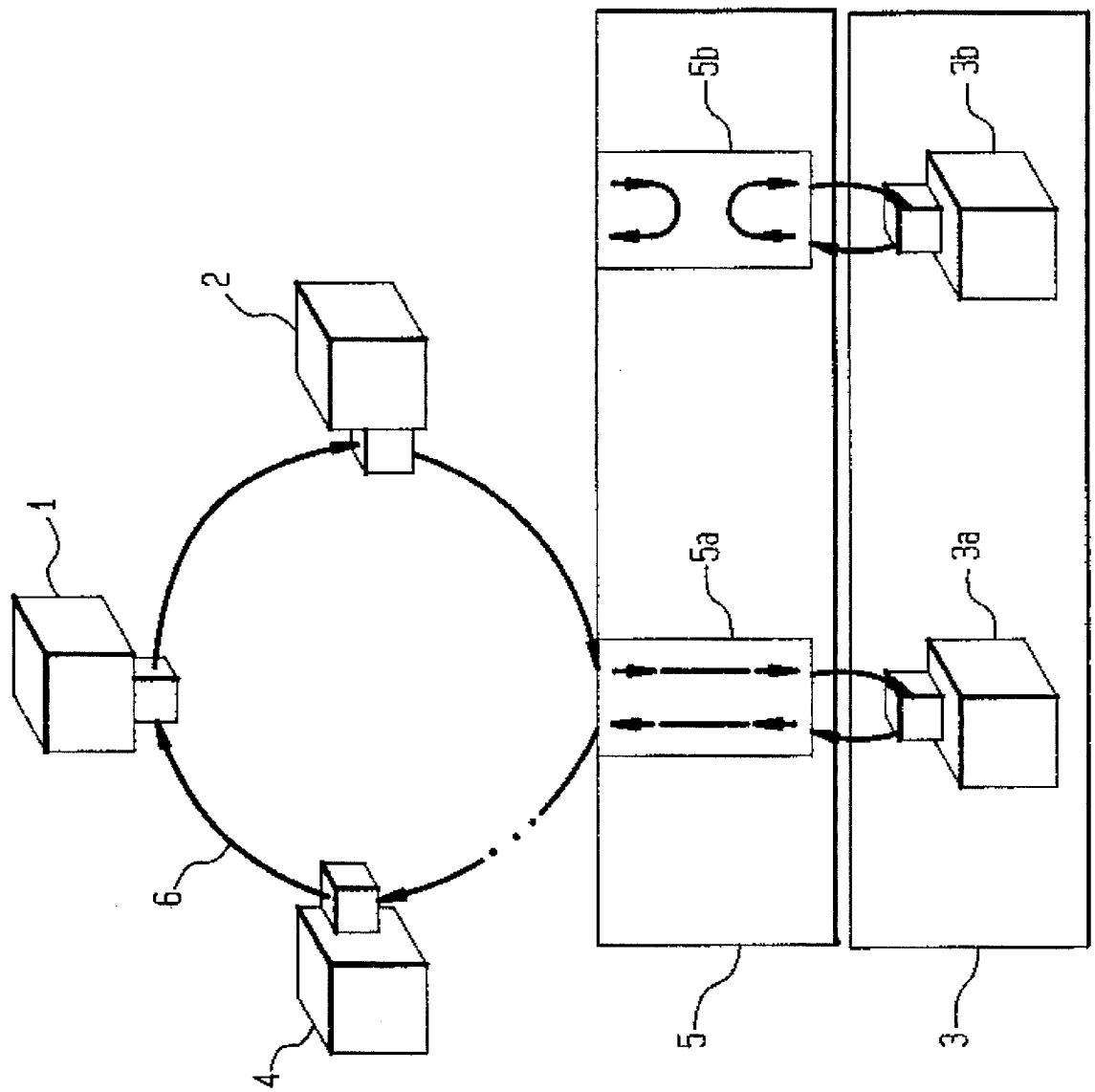
FIG. 1 is an illustration of a ring network, showing both normal and bypassed optical flow.

FIG. 1 is an illustration of a ring network 6, which comprises a multiplicity of nodes 1, 2, 3 and 4, connected in serial fashion. The node numbered "4" represents the "nth" node, so that there can be any number of nodes attached to the ring. A connecting means 5 serves as the interface between the ring and node. The connecting means 5 can re-route optical information in either of two ways. This is illustrated in FIG. 1 by showing one connection as block 5a and the other as block 5b with blocks 5a and 5b connected to node blocks 3a and 3b, respectively. It should be understood that a single node 3 and single connecting means 5 are in fact employed. The normal optical information flow from the ring 6, across the connecting means 5, to the node 3, across the connecting means 5 and back to the ring, known as the cross-state of the connector, is illustrated by connecting means block 5a. As previously mentioned, if a node fails or is disconnected, the ring will fail unless continuity of the ring is maintained. Connecting means block 5b illustrates how ring continuity is maintained according to the present invention. Upon failure or disconnection of node 3, the node is bypassed by optical loopback, which will be referred to as the bar-state. Optical loopback is achieved by incorporating an optical bypass device, discussed below, into various fiber optic connectors.

FIGS. 2a–2d illustrate a first embodiment of a bypass device 15 according to the present invention. As noted above, the device 15 is suitable for providing the function illustrated in FIG. 1. The device 15 possesses a plurality of reflective surfaces 11, 12 and 13 which are configured to direct an input optical beam or beams 10 from a first fiber or waveguide, not shown, to a second fiber or waveguide.

Figure 2C:
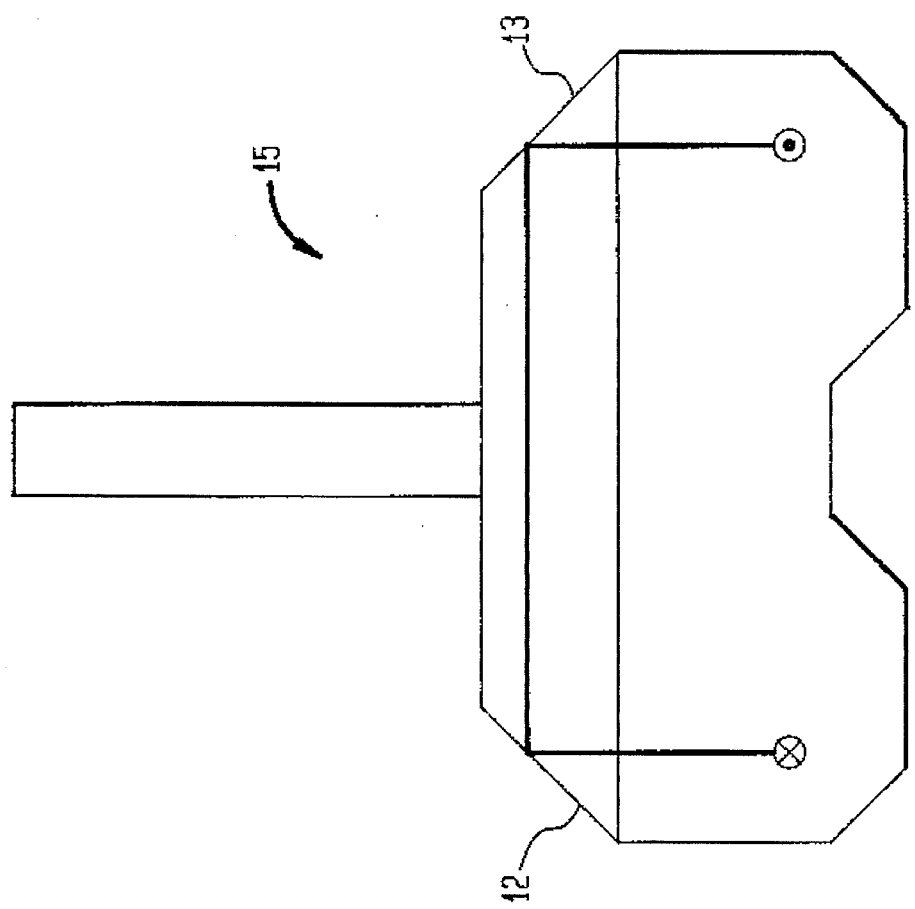
FIG. 2c is a cross-sectional view of the apparatus shown in FIGS. 2a and 2b, showing second and third reflective surfaces of the optical bypass device.
Figure 2B:
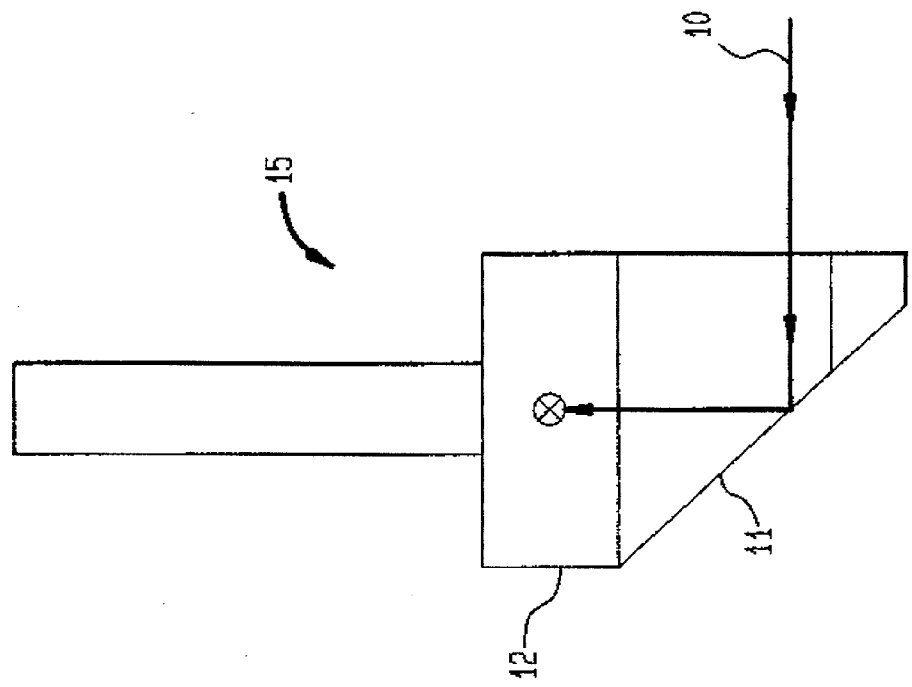
FIG. 2b is a side-view of the apparatus shown in FIG. 2a, showing first and second reflective surfaces of the optical bypass device.
Figure 2D:
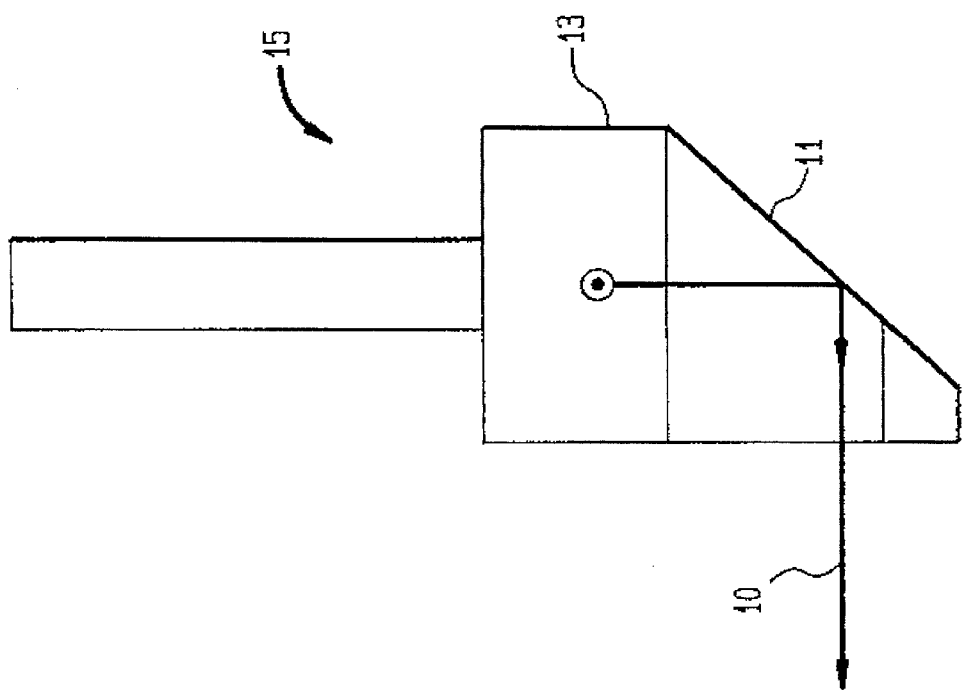
FIG. 2d is a side-view of the apparatus shown in FIGS. 2a–2c, showing first and third reflective surfaces of the optical bypass device.

As shown in perspective in FIG. 2a and by a side view in FIG. 2b, the optical beam 10 enters the bypass device 15 and, upon contact with reflective surface 11, is reflected upwardly to contact reflective surface 12. The beam is reflected off surface 12 and contacts reflective surface 13, as shown in FIGS. 2a and 2c. After contact with surface 13, the beam is reflected downwardly to reflective surface 11, as shown in FIGS. 2a and 2d. Upon contact with reflective surface 11, the beam is directed out of the bypass device to a waveguide or optical fiber, not shown. The optical beam 10 exits the bypass device traveling in a direction opposite to the direction the beam was traveling when it optically engaged the bypass device.

A stem 89 allows the bypass device to be attached to an actuating system. The actuating system may be a simple mechanical arrangement wherein the bypass device is attached to a pivoting member, or a more sophisticated electromechanical or electronic arrangement. Such systems will be discussed in more detail below in conjunction with the improved fiber optic connectors of the present invention.

The optical bypass device 15 must possess an exterior structure which is adapted to cooperate with the structure of existing connectors. In particular, fiber optic connectors typically have "vee-grooves" in which the optical fibers are placed. To readily engage the optical signal without substantial redesign of such existing connectors, it is desirable to design the bypass device to protrude into the vee-grooves. Regions 19 and 20 of the bypass device 15 are shaped to be received by the vee-grooves of such connectors. Further, the regions 19 and 20 facilitate proper alignment of the bypass device 15.

While the first embodiment of the invention is described as a particular arrangement of reflective surfaces, it should be understood that a multiplicity of arrangements exist whereby a plurality of reflective surfaces may be configured to alter the path of an optical signal as described. Such arrangements are within the contemplated scope of this invention; it being recognized that other suitable arrangements may readily occur to those skilled in the art in view of the teachings of the present invention. It should also be understood that the term "waveguide" may be used interchangeably with fiber or fiber path within this specification.

The above described bypass device 15 may be formed as follows. A material transparent to the desired wavelength, i.e., that of the optical signal, is shaped by methods known to those skilled in the art, including, but not limited to, molding and micromachining methods. Suitable materials for forming the device include, but are not limited to, glass, plastic and silicon. The exterior appearance of the device may be as shown in FIG. 2a. The stem 89 may be formed as an integral part of the bypass device, or it may be separately formed and attached. Other exterior configurations of the bypass device which may occur to those skilled in the art are likewise acceptable; it being recognized that the principles of the present invention could be readily employed with different devices designed in the future. However, such configurations should preferably facilitate integration with an actuating device and existing fiber optic connectors as previously discussed.

The reflective surfaces 11, 12 and 13 may be formed by applying a material that creates a suitable reflective interface at the appropriate locations in the structure. The material may be the same as that forming the bulk of the device 15, i.e., glass, plastic or silicon. In such a case, the index of refraction of the applied material should be tailored so that the interface acts as a mirror. Selection of an appropriate index of refraction and methods for tailoring to achieve such an index of refraction are well known to those skilled in the art. Alternatively, a metallic coating., such as gold, may be applied to form a reflective interface. The applied material is chosen so that the optical beam is reflected with minimal energy loss. The material may be applied to the surface by methods known to those skilled in the art, including, but not limited to, vapor deposition, or brushing or dipping, as appropriate.

Figure 3:
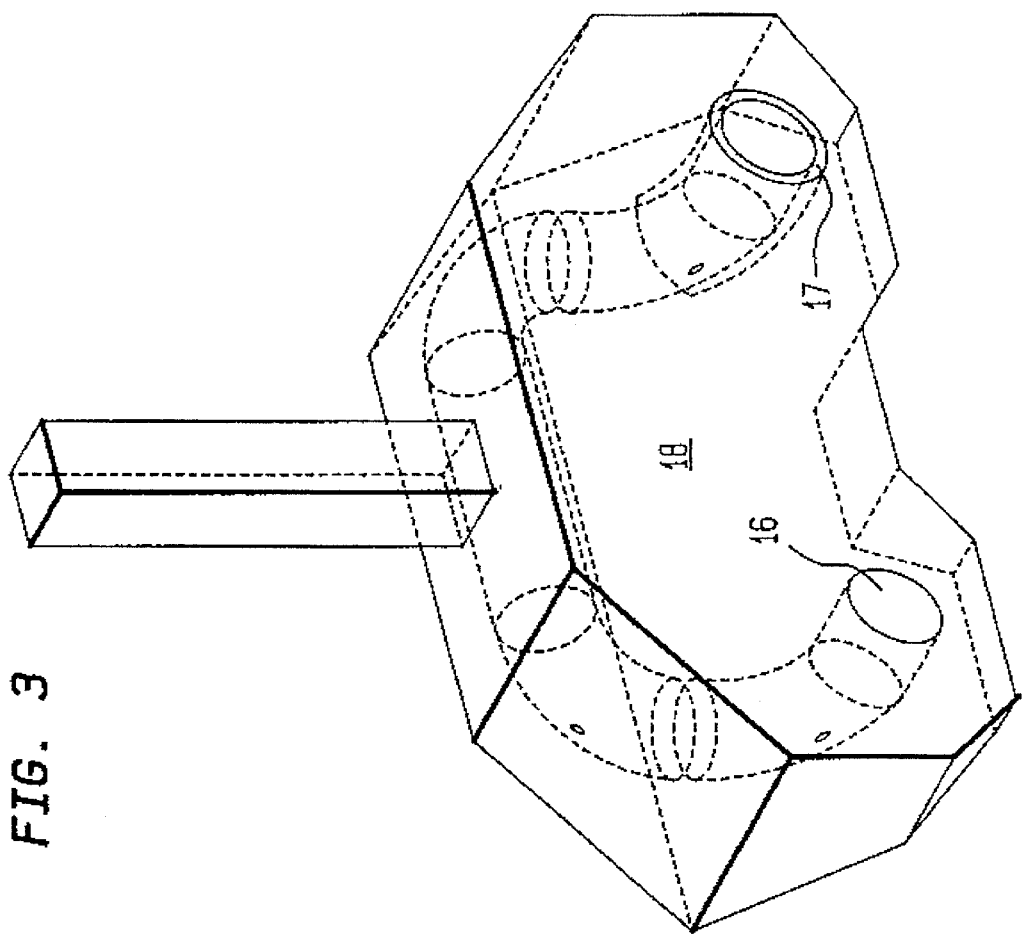
FIG. 3 is a perspective view illustrating a second embodiment of an optical bypass device which uses waveguiding material to alter the path of an incoming optical signal.

A second embodiment of an optical bypass device according to the present invention is illustrated in FIG. 3. A core 16 of waveguiding material, rather than reflective surfaces, is used to redirect an optical beam or beams. Any optically suitable waveguiding material may be used. Examples include, but are not limited to, silicon or glass. The shape and external structure of the bypass device utilizing waveguiding material need not be the same as the embodiment of the device using reflective surfaces. However, since the device has been designed to fit in the grooves of various fiber optic connectors to ensure proper alignment, there is an advantage to maintaining this shape.

To form such a device, a core 16 of optically suitable material having a given refractive index is cladded with at least one layer 17 of material having a different refractive index than the core material. For clarity, only a small section of the cladding layer is shown. It should be understood that the cladding layer completely covers the core 16. Optically suitable materials for the core include, but are not limited to, silicon or glass. Cladding may be applied by standard deposition methods or other methods known to those skilled in the art. The optically suitable material is arranged so that it will have an appropriate path length and be properly positioned so that it will receive an optical beam from a waveguide associated with a connector or switch. Finally, the bulk of the bypass device is formed from silicon or other suitable material 18 and the device is shaped to be received by the grooves of an optical connector. Where the material 18 has a suitable refractive index, a separate cladding layer 17 may be omitted. Inotherwords, the material 18, which forms the bulk of the device, may function as the cladding layer 17. Where the material 18 forming the bulk of the bypass device of the device does not have a waveguiding function, it may be virtually any material which may be conveniently machined, etched or shaped. However, to the extent that the optical beam to be redirected must pass though the bulk material to engage the waveguiding region, the material must be transparent to the optical beam at least at that location. In a third embodiment, the bypass device may possess a plurality of reflective surfaces as well as a core of waveguiding material.

The optical bypass, utilizing either reflective surfaces or a channel of waveguiding material, may be incorporated into different types of standard connectors resulting in improved connectors which provide a loopback or switching function. These embodiments of improved connectors and switches are discussed below.

In a first switch/connector embodiment, the invention provides for optical loopback in the case of circuit pack removal from a circuit pack enclosure. Where the circuit packs are configured as a ring network, with each pack representing a node as in FIG. 1, circuit pack removal would render the network, i.e., all circuit packs, non-operational, in the absence of some means to provide loopback.

FIG. 4a illustrates the cross state through an improved connector 40, comprising a female piece 38 which may be attached to a backplane and male piece 37 which may be attached, for example, to the circuit pack being removed. Optical beam 30 propagating along fiber or waveguide 41 located in vee-groove 49 encounters ball lenses 45, 47 and then passes into the fiber or waveguide 42 on its way to an optical device in the circuit pack, not shown. The ball lenses 45, 47 collimate and refocus the optical beam 30 minimizing signal loss across the connector. An optical signal 31 from the circuit pack, not shown, may likewise be propagating along a fiber or waveguide 43. Signal 31 will pass through other ball lenses 48, 46 and into a fiber or waveguide 44. The connector 40 also comprises an optical bypass device 15, not shown in FIG. 4a for purposes of clarity. While the circuit pack remains in the circuit pack enclosure, the cross state is maintained and the optical bypass device 15 does not engage the optical beam 30.

Figure 4B:
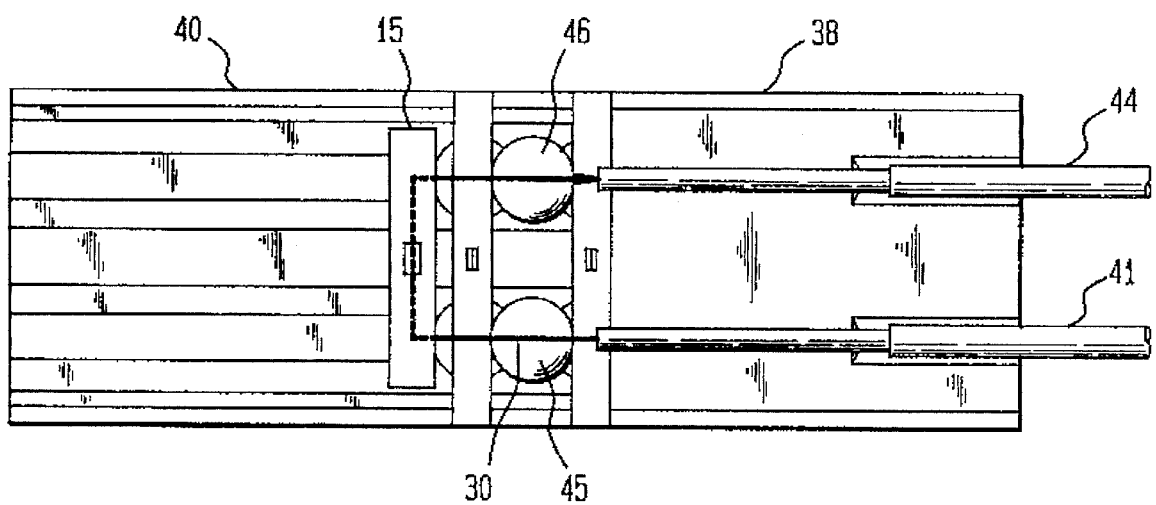
FIG. 4b is a plan-view of the apparatus shown in FIG. 4a showing the female member of the connector with the male member removed and illustrating the bar state of the connector due to the presence of an optical bypass device in the signal path.
Figure 5:
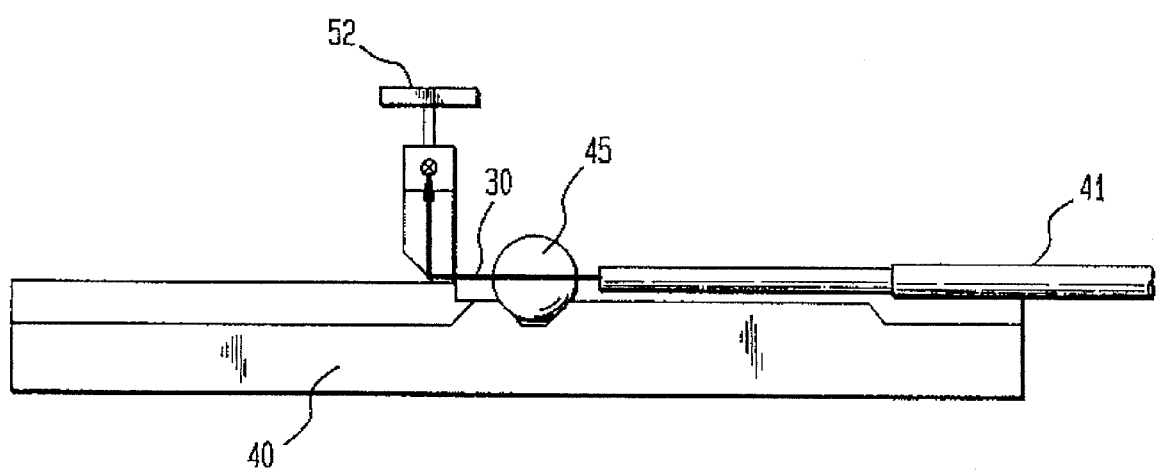
FIG. 5 is a side-view of the apparatus shown in FIG. 4b, with the optical bypass device shown in the signal path.

FIGS. 4b and 5 show the female piece 38, with the male piece 37 disconnected and removed, representative of circuit pack removal. The optical bypass device 15 is inserted into the path of signal 30. The optical bypass device 15, in conjunction with the female piece 38, redirects the optical beam 30 to achieve the optical loopback function and avoid disabling the entire network connected to the connector 40. When in place, the device redirects the optical beam from optical fiber 41 to an adjacent fiber 44 located in vee-groove 50. Ball lenses 45 and 46 ensure that the beam 30 is directed with minimum loss from the fiber 41 to the bypass device and on to the fiber 44. It should be understood that the direction of propagation of the optical beam described in the specification and shown in the Figures for the various embodiments of the present invention is for purposes of discussion only and is not intended to be limiting in any manner.

An actuating device 52 may be used to position the bypass device. For example, as the male piece 37 is disconnected, the optical bypass device 15 may pivot into place if the connectors are suitably configured. This may be referred to as "passive" actuation, i.e, the presence of the bypass device in the optical path is not in response to an actuating signal. An "active" actuator, such as electronic and electromechanical arrangements known to those skilled in the art could likewise be used. Alternatively, the optical bypass device 15 may be manually positioned on the female piece 38.

Figure 6:
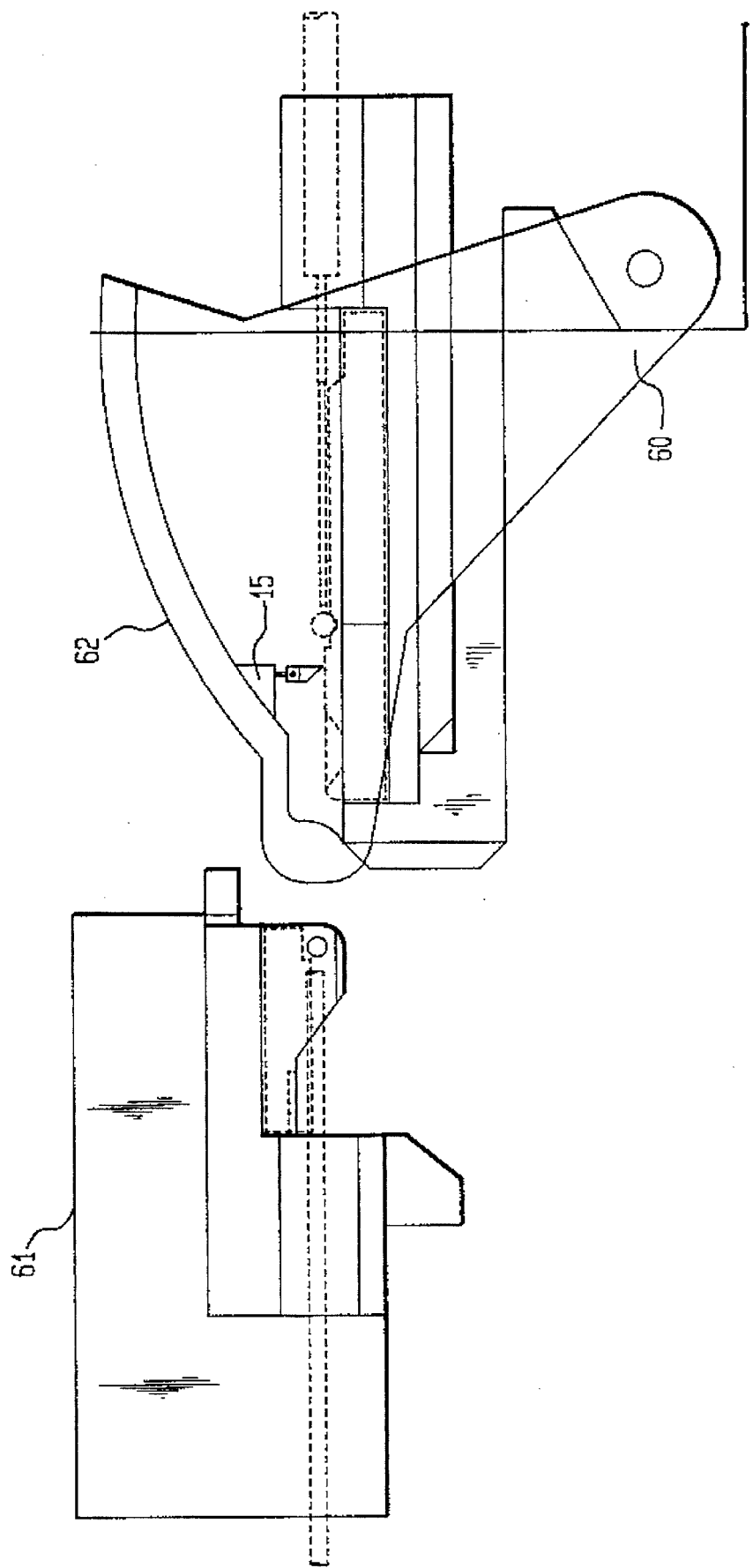
FIG. 6 shows demated members of an improved retracting optical fiber connector according to the present invention.
Figure 7:
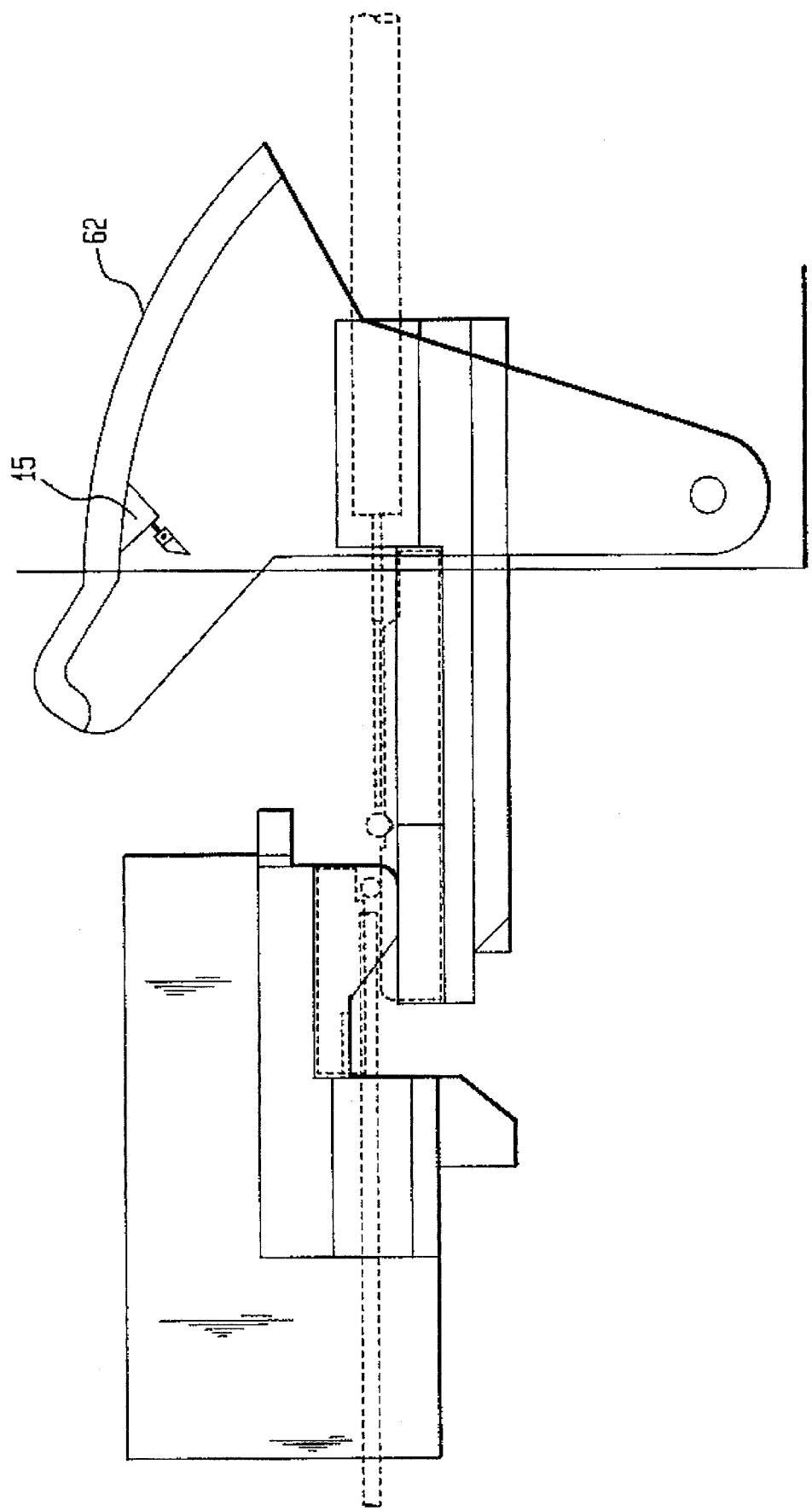
FIG. 7 shows the apparatus of FIG. 6 in mated relation.

A second switch/connector embodiment, an improved retracting optical fiber connector, is shown in FIGS. 6 and 7. The improved connector incorporates an optical bypass device 15 into the connector described in U.S. Pat. No. 5,080,461, which is incorporated herein by reference in its entirety. In FIG. 6, female 60 and male 61 connectors are shown in full de-mated configuration. The female connector contains a fiber pair. Without loss of generality, one of the fibers may be designated "In" and the other "Out". When the connectors are demated, the bypass device 15 directs the optical beam from the "In" fiber to the "Out" fiber, providing a complete path. By being connected to the retractable housing 62 of the connector 60, which housing is forced back when the connector is mated, the bypass device 15 is moved completely out of the optical path, and does not interfere with the optical beams propagating through fibers or waveguides on the connector. FIG. 7 illustrates the mated configuration.

The need for standardization within local area networks (LAN) has resulted in the Fiber Distributed Data Interface (FDDI). FDDI topology utilizes a ring structure in which two contrarotating rings are used. Operation is routed to the secondary ring if a failure, such as a cable break, occurs in the primary ring. Rerouting is controlled by the station management function. Network operation is not affected by station failure, since stations are provided with optical bypass switches such as the moving fiber or moving mirror switch.

Figure 9A:
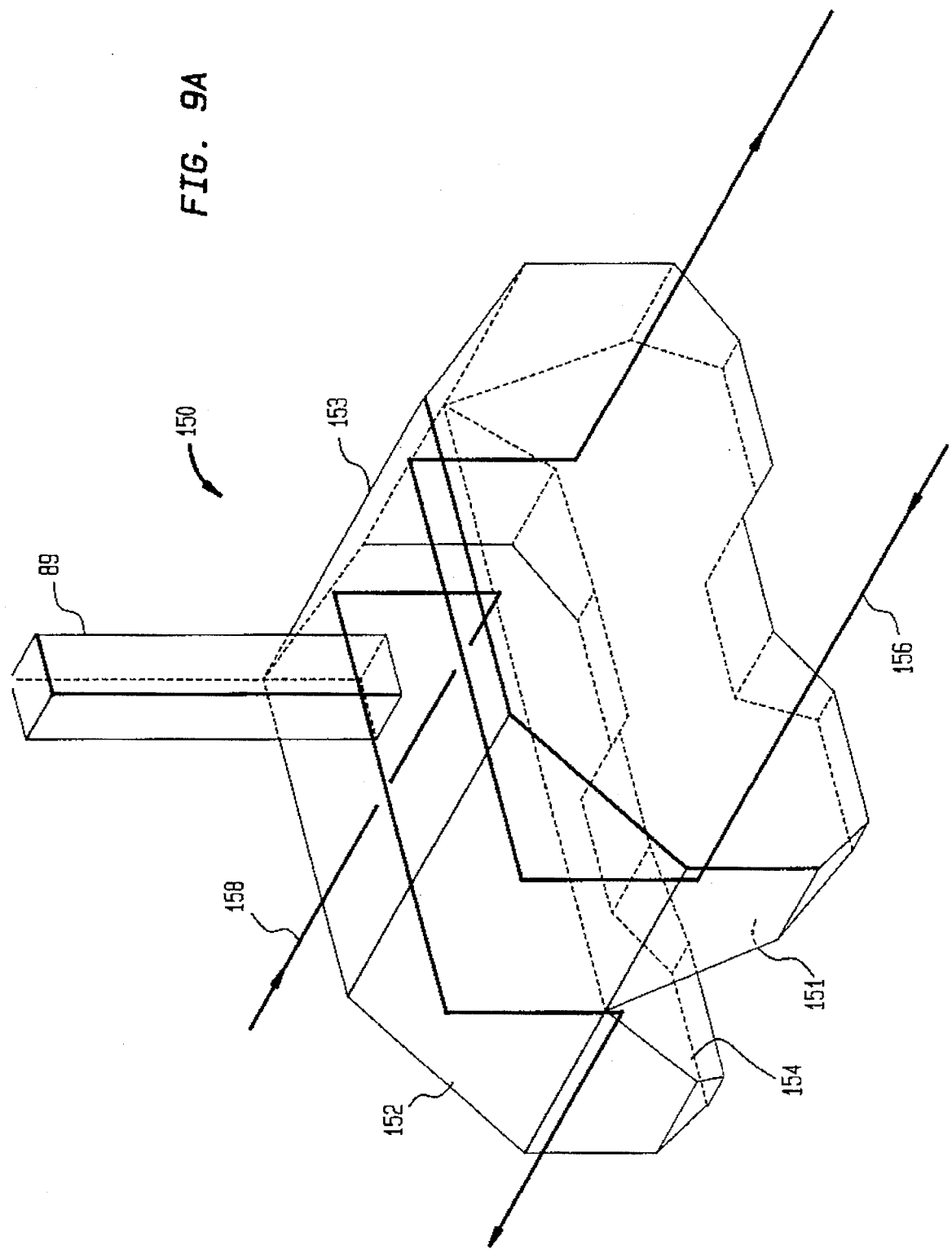
FIG. 9a is a perspective view of an embodiment of a dual bypass device according to the present invention.
Figure 9B:
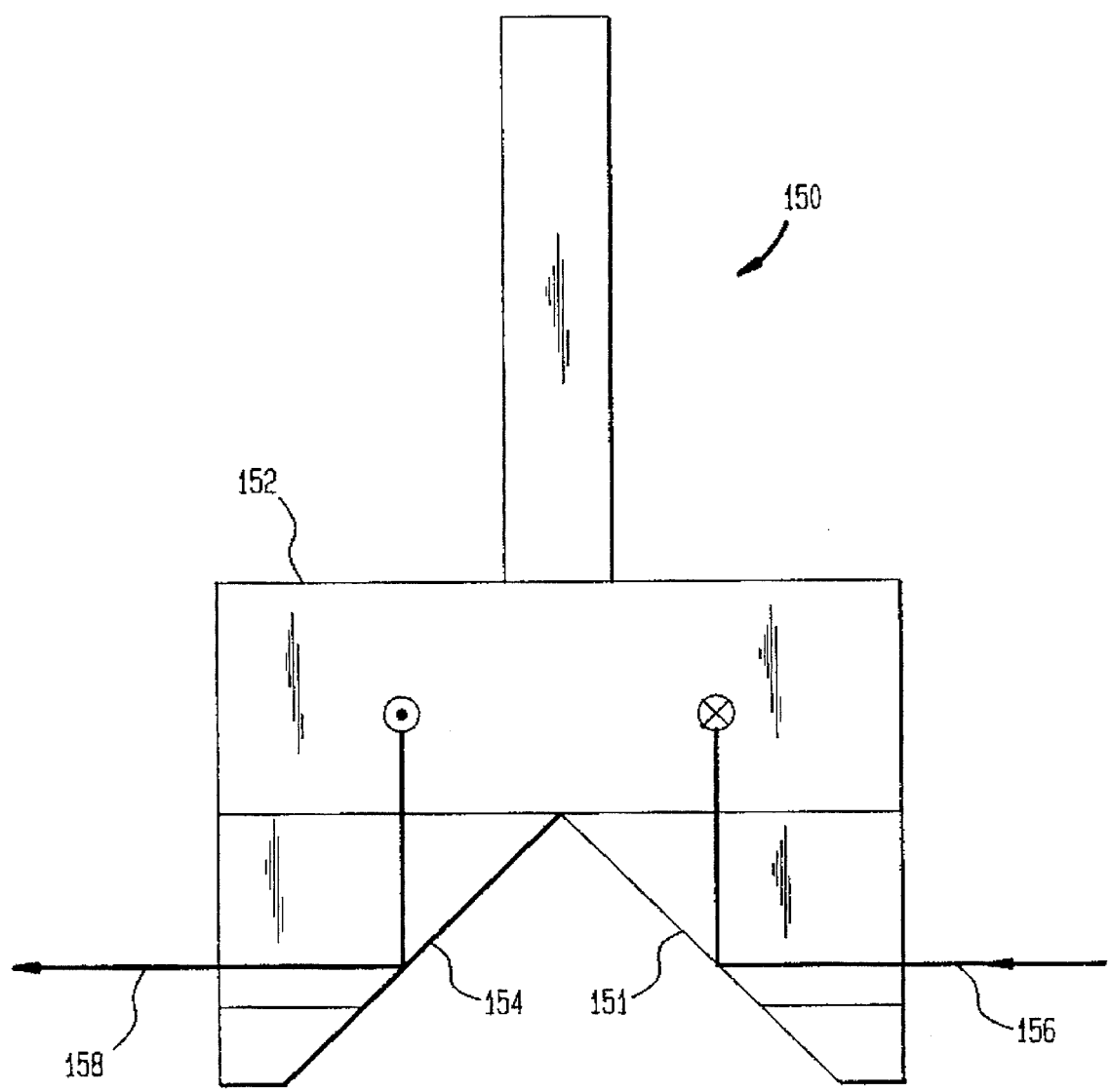
Figure 10:
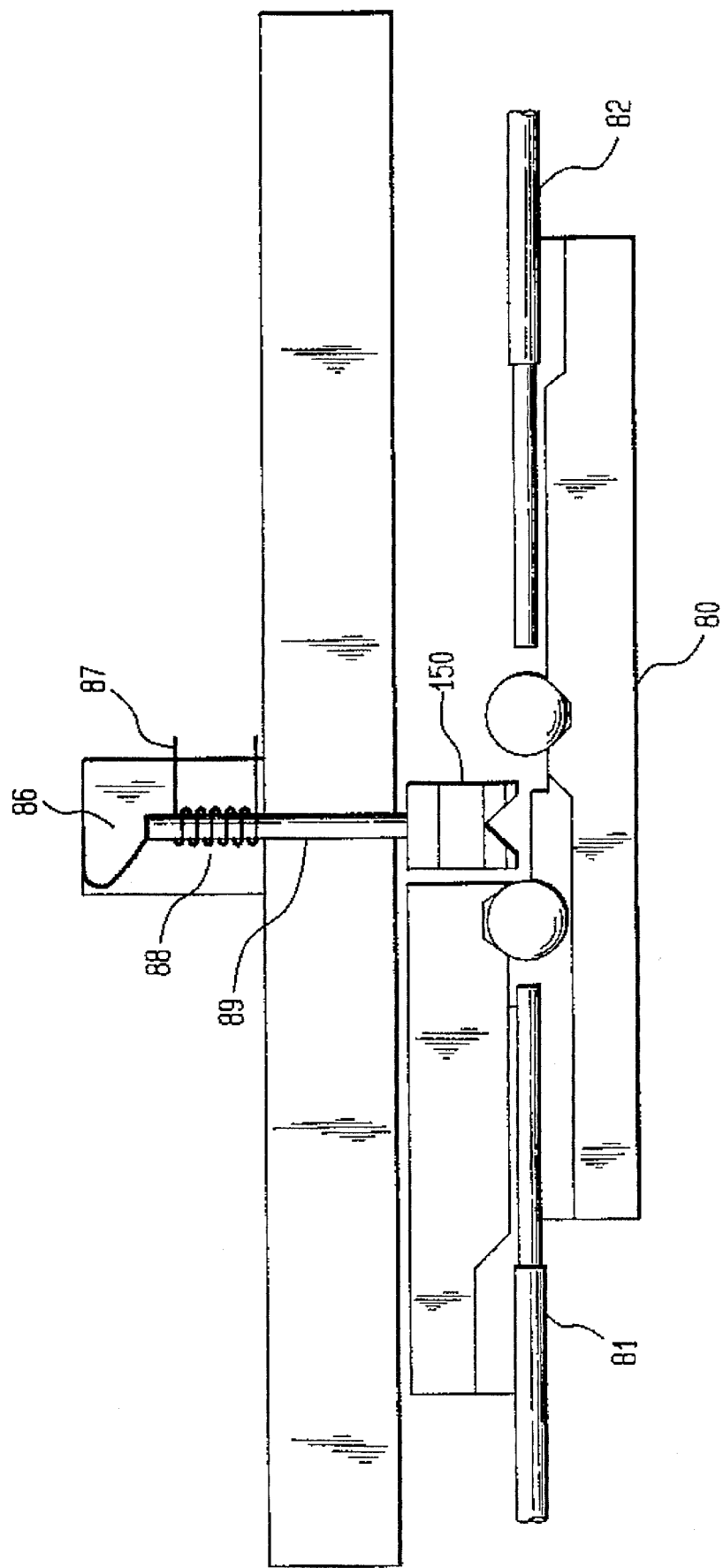
FIG. 10 shows the connector of FIGS. 8a–c in conjunction with a bypass device actuator, showing the optical bypass device in the retracted position.

A third switch/connector embodiment of applicants' invention is illustrated in FIGS. 8–10. This embodiment uses a bypass device 150 according to the present invention to create an improved FDDI compatible bypass connector. This connector is intended as a failsafe device. The failsafe function provides optical continuity when the connector is physically demated, or when electrical power is removed from the node. FIG. 8a shows the cross state through a connector 80. An optical beam 32 propagates along a waveguide 81, passes through ball lenses 71, 72 and into a waveguide 82. An optical beam 33 propagates in the opposite direction along waveguides 83 and 84. An optical bypass connector 150, not shown in FIG. 8a, remains out of the optical beams 32 and 33 during normal network operation.

FIGS. 8b and 8c show the improved bypass connector 80 in the bypass mode or bar state. In this mode, the optical bypass connector 150 is inserted into the path of the optical beams 32 and 33. The optical beam 32 from the waveguide 81 is looped back to the waveguide 84. The optical beam 33 from the waveguide 83 is similarly looped back to the waveguide 82. In this embodiment, the bypass device provides loop-back for two signals. The bypass device 150 is thus the functional equivalent of abutting two bypass devices of the previous embodiments, one oriented to receive the optical beam 33, the other to receive the optical beam 32. This configuration of the bypass device 150 is shown in FIGS. 9a and 9b and will be referred to as a dual bypass device.

FIG. 9a shows a perspective view of an embodiment of the dual bypass device 150 causing two optical signals 156, 158 to loop back. The signal 156 encounters a reflective surface 151 and is reflected upwardly to a reflective surface 152. Following contact with the surface 152, the signal 156 is reflected laterally to a reflective surface 153 and then downwardly to the reflective surface 151. The signal is reflected off of the reflective surface 151 and out of the dual bypass device 150. Meanwhile, a second signal 158 enters the dual bypass device 150 and contacts a reflective surface 154, which reflects the signal 158 upwardly to the reflective surface 153. Upon contact with the reflective surface 153, the signal 158 is reflected laterally to the reflective surface 152, then downwardly to the reflective surface 154. The signal 158 is reflected off of the reflective surface 154 and out of the dual bypass device. FIG. 9b shows a side view of the dual bypass device. The dual bypass device 150 may utilize a core of waveguiding material, rather than reflective surfaces, as discussed in conjunction with the second embodiment of the optical bypass device 15. Further, one side of the dual bypass device may utilize reflective surfaces and the other side may utilize a core of waveguiding material.

FIG. 10 shows an actuating device 87 being used in conjunction with the improved bypass connector 80. In the embodiment shown in FIG. 10, an electrically activated solenoid 88 is used to control the movement of the optical bypass device 150. A spring 86 is used to exert a pressure on a shaft 89 connected to the optical bypass device 150. During normal operation of a network such as FDDI, a current would be placed through the coils of the solenoid which would exert force against the restoring spring and move the optical bypass device to the retracted position. In this state, the optical beams will travel unimpaired from each side of the connector (male to female). If a node fails, this condition will be sensed, current through the coils of the solenoid 88 will be interrupted, and the spring 86 will move the bypass device into the optical path placing each end of the connector, male and female, into a loopback state. It should be understood that a variety of suitable actuating devices will occur to those skilled in the art and such devices are within the contemplated scope of the present invention.

Figure 11:
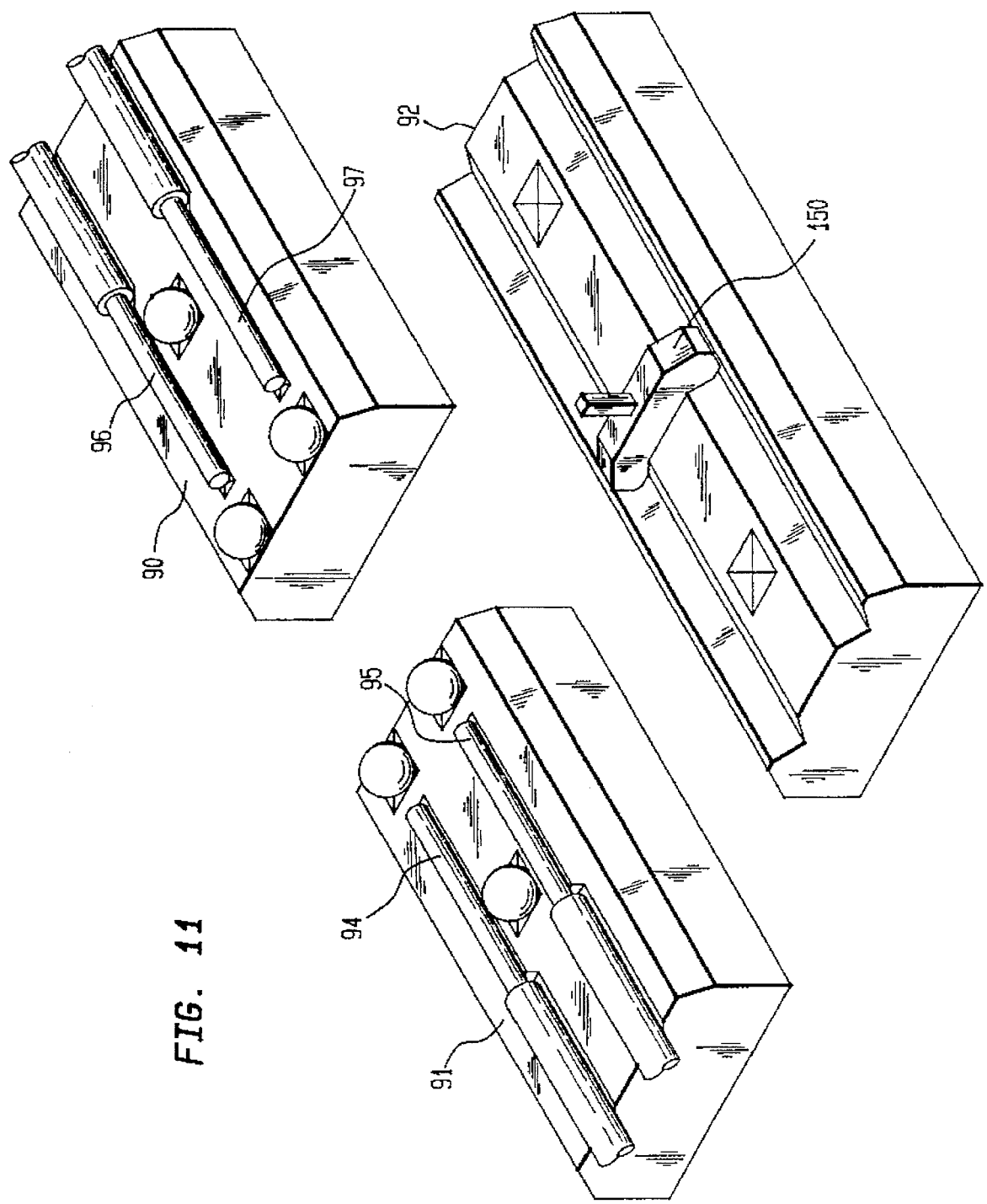
FIG. 11 shows two male optical connectors and a mating female piece with an optical bypass device which may be assembled to create an improved connector coupler according to the present invention.

A fourth switch/connector embodiment is illustrated in FIGS. 11–13. In this embodiment, an improved male to male optical connector according to the present invention is used in conjunction with the optical bypass device to provide loopback capabilities. Large fiber-optic networks may contain devices to allow connections through mechanical bulkheads or other obstructions. Male to male connectors would typically be used in such an application. FIG. 11 shows two male connectors, 90, 91, and a female piece 92 with an optical bypass connector 150, which together form an assembly 93 shown in FIGS. 12 and 13. FIG. 12 shows the bypass device 150 connected to an actuator. In FIG. 12, the bypass device 150 is out of the signal path. For the present example, it is assumed that two signals, 98 and 99, are propagating through the waveguides 94 and 97, respectively. A dual bypass device, such as device 150, is thus required. FIG. 13 shows the bypass device inserted in the optical path of the waveguides 94 and 97, causing the signals 98 and 99 to loop-back. Either an active or passive actuator could be used to redirect the optical beam in the case of either the removal of one of the male connectors from assembly 93, or the breakage of a fiber that would cause the fiber-optic network to attempt to loopback around the affected fiber.

A fifth switch/connector embodiment illustrates the use of bypass devices according to the present invention in a nonconnector application. As shown in FIGS. 14a,b and 15, the bypass device 150 may be used to create a standalone 2×2 optical bypass switch 106. With the switch in the cross state, shown in FIG. 14a, optical signals 107 and 108 propagate from waveguides 101 and 104, to waveguides 102 and 103, respectively. The optical bypass device, not shown in FIG. 14a, remains out of the path of the optical signals 107 and 108.

Figure 15:
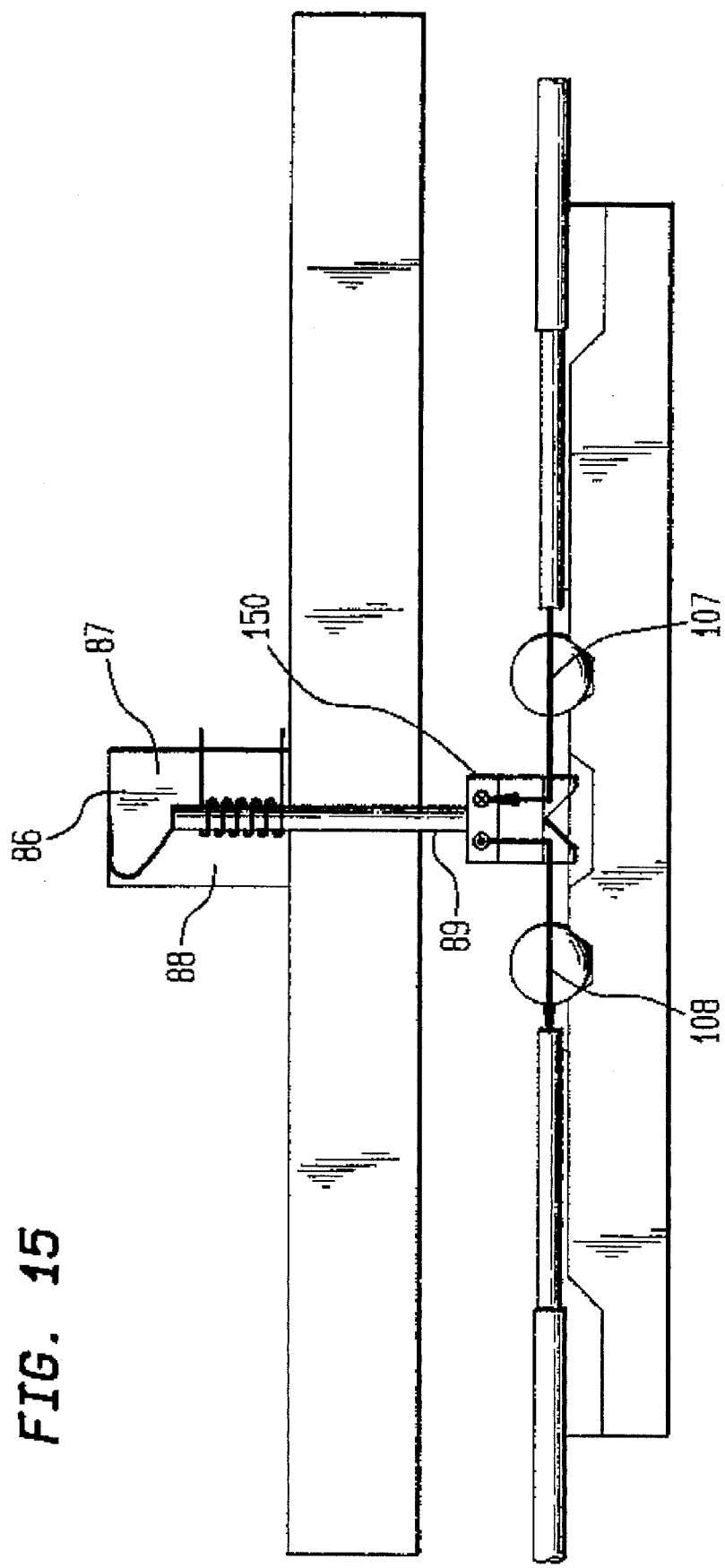
FIG. 15 is a side view of the apparatus of FIG. 14b, showing the apparatus in conjunction with a bypass device actuator.

In the bar state, shown in FIG. 14b, the bypass device 150 is inserted into the signal path, causing the signals to loopback, thus providing a switching function. This embodiment is shown utilizing active loopback, i.e., the position of the bypass device 150 is controlled by an electrically activated solenoid 88, as shown in FIG. 15.

Figure 16A:
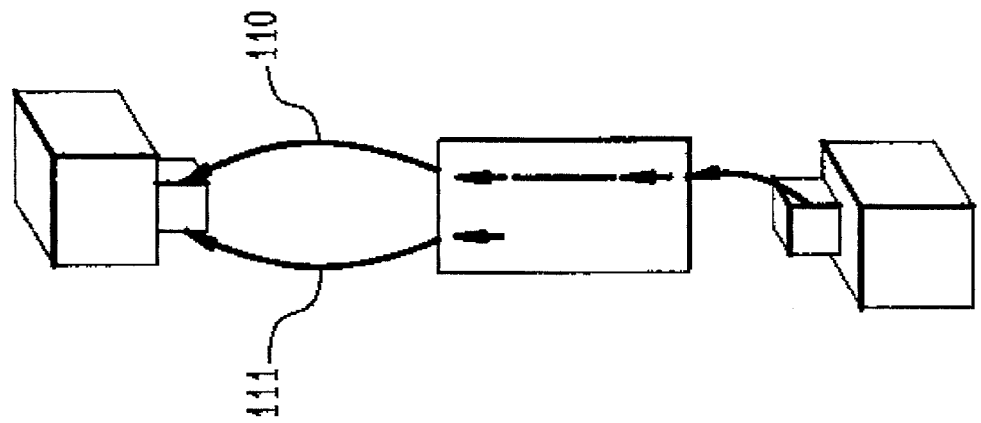
FIGS. 16a and 16b provide an illustration of protection line switching.
Figure 16B:
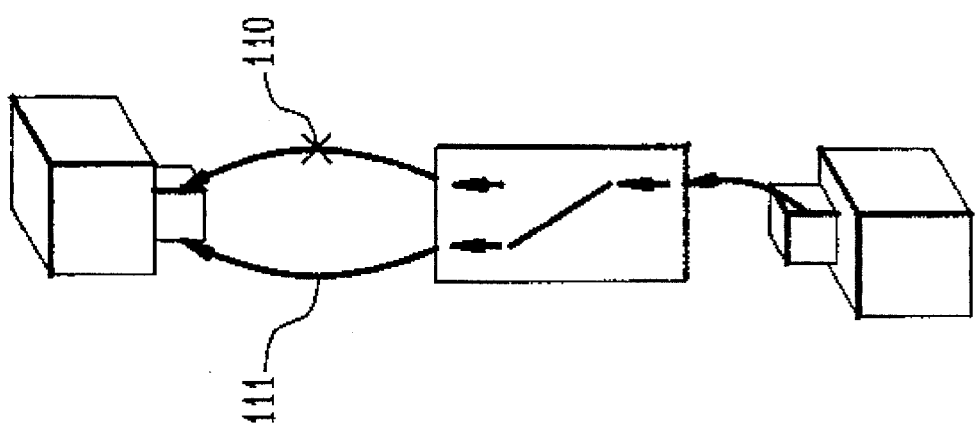

In fiber-optic systems, redundancy in the fiber path is often accomplished by having more than one fiber path between any two points. A selector, referred to as a "protection line switch," is used to direct the optical beam to the appropriate fiber path. This is illustrated in FIGS. 16a and 16b, where, in FIG. 16a, the selected fiber path is path 110. In FIG. 16b, the switch selects path 111. In a sixth switch/connector embodiment, illustrated in FIGS. 16a–21, bypass devices according to the present invention can be used to redirect the optical beam in such a way that it does not cause a loopback, but instead causes this selection function. A bypass device 130, shown in FIG. 17, when inserted to engage an optical beam 122, causes the beam to be displaced from its path to a fiber 126 so as to enter an alternate fiber 128, as best shown in FIG. 19. It is understood that while two fiber paths are shown in the illustrative example, the inventive principle applies equally to systems with more than two paths. Where more than two paths are required, a plurality of optical bypass devices can be used in series.

An exemplary arrangement for a 1 to 4 selector is described below. As a first bypass device engages an optical signal, it is displaced from its path to a first fiber so as to enter a second fiber. This accomplishes a 1 to 2 selection. If 1 to 3 selection is desired, a second bypass device engages the output of the first device so as to direct the optical signal to a third fiber. By inserting a third optical bypass device in the signal path of the output from the second device, the signal can be directed to a fourth fiber. In this manner, any number of fiber paths may be accessed. Thus, bypass devices according to the present invention can be used to create a i to N selector switch, useful to implement a protection line switch or other switching functions.

Figure 18B:
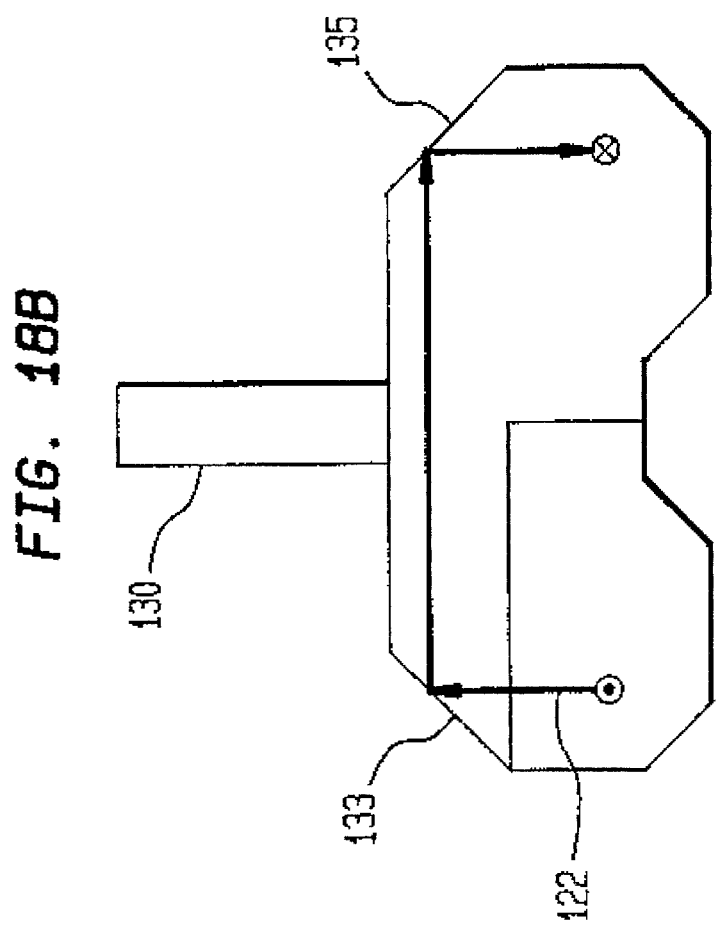
Figure 18A:
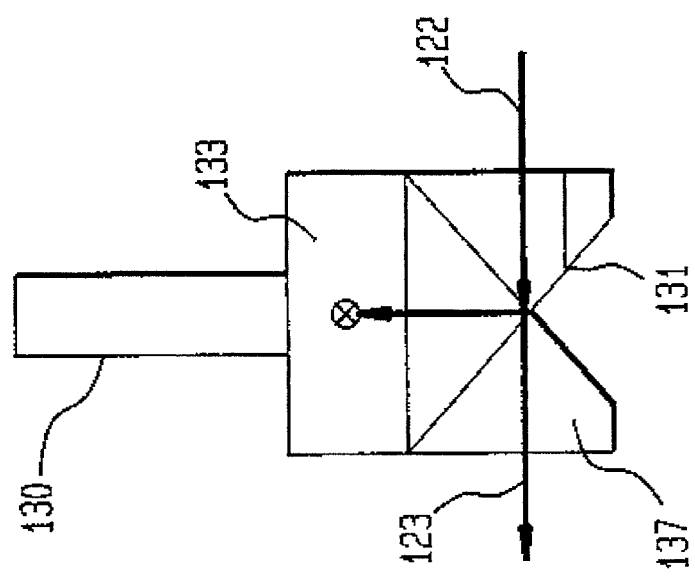
FIG. 18a is a side-view of the apparatus of FIG. 17, showing the first, second and fourth reflective surfaces.
Figure 19:
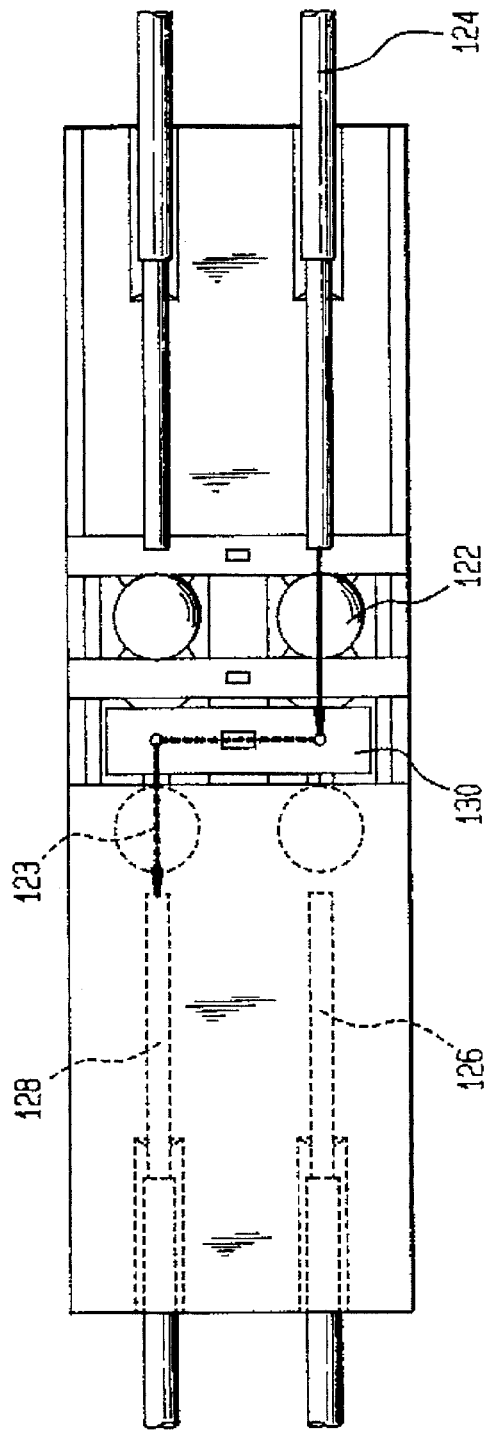
FIG. 19 is a plan-view of a selector switch according to the present invention showing the signal path when the bypass device is in the inserted position.

FIGS. 17, 18a and 18b show a bypass device 130 adapted to provide this function. A reflective surface 131 causes an incident beam 122 to be directed upwardly to a reflective surface 133. The reflective surface 133 deflects the beam 122 laterally to a surface 135, which further deflects the beam to a surface 137. The reflective surface 137 is oriented to cause the exiting beam 123 to continue in its original direction, i.e., to the left in FIGS. 18a and 19, rather than causing loop-back. Thus, as best seen in FIG. 19, waveguide 128 is selected over waveguide 126.

Figure 20:
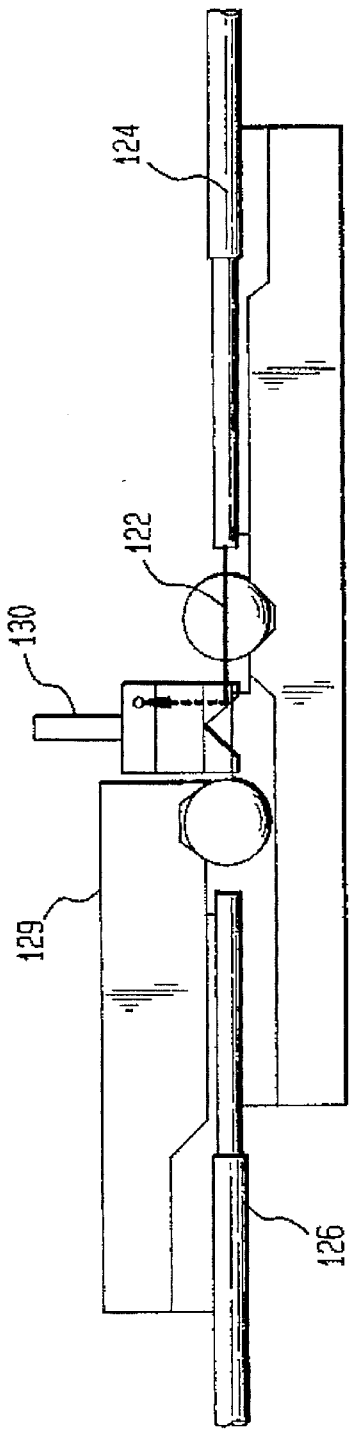
FIG. 20 is a side-view of the apparatus of FIG. 19.
Figure 21:
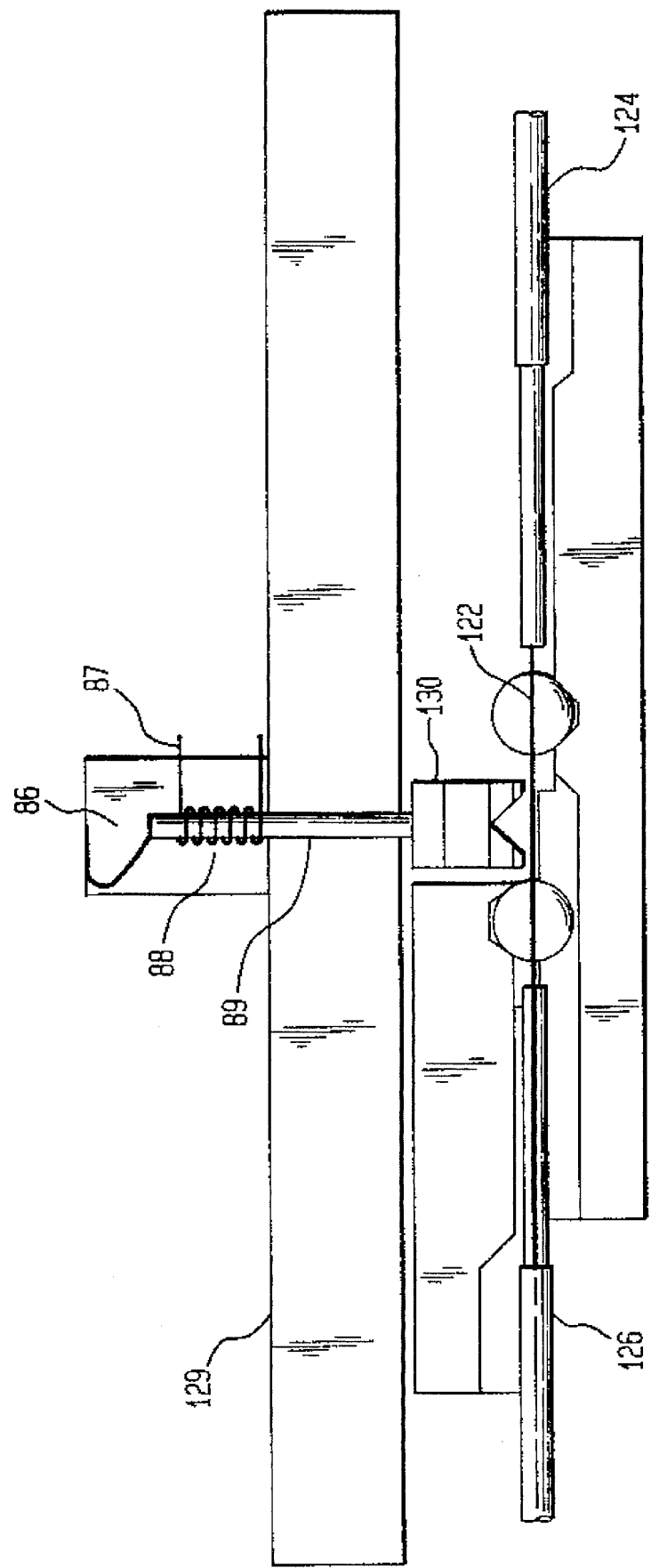
FIG. 21 is a side-view of the apparatus of FIG. 19 in conjunction with a bypass device actuator with the bypass device shown in the retracted position.

FIG. 20 is an illustrative embodiment of a selection or protection line switch 129, which includes two connectors in mated relation in conjunction with the bypass device 130, shown in the inserted position. FIG. 21 shows the switch with the bypass device 130 in the retracted position. The bypass device actuator is shown in FIG. 21. As shown, the bypass device provides an extremely compact mechanism to accomplish protection line switching. While illustrated with an optical bypass device using reflective surfaces, it should be understood that a bypass device utilizing waveguiding material can be configured as above.

It should be understood that the embodiments and variations shown and described herein are illustrative of the principles of this invention and that various modifications may occur to, and be implemented by, those skilled in the art without departing from the scope and spirit of the invention.

We claim:

1. An optical bypass connector comprising:
    directly engageable female and male connector members, each of which comprises at least first and second waveguides, wherein the first and second waveguides of the second connector member are spaced apart congruently with respect to the first and second waveguides of the first connector member so that the respective waveguides of the first and second connector members engage optically when the first and second connector members are engaged; and
    an optical bypass device having an optical waveguiding region configured to direct optical signals received from the first waveguide of the male connector member to the second waveguide of the male connector member,
    wherein the optical bypass connector has two states, a bar state in which the bypass device is in a first position wherein the bypass device engages an optical signal received from the first waveguide of the male connector and directs it to the second waveguide of the male connector, and a cross state in which the bypass device is in a second position wherein the bypass device does not engage the optical signal such that the optical signal passes from the first waveguide of the male member to the first waveguide of the female member.

2. The optical bypass connector of claim 1 further comprising an actuating device which cooperates with the optical bypass device to place the bypass connector in the bar state when the cross state cannot be maintained.

3. The optical bypass connector of claim 2 wherein the actuating device responds to an actuating signal.

4. The optical bypass connector of claim 1 further comprising vee-grooves, wherein a portion of the bypass device is configured to be received by the vee-grooves.

5. The optical bypass connector of claim 1 wherein the optical waveguiding region comprises a plurality of reflective surfaces.

6. The optical bypass connector of claim 1 wherein the optical waveguiding region comprises a core of optically suitable material and at least a first layer of cladding, wherein the relationship between the refractive index of the core and refractive index of the cladding is such that an optical signal may be guided by the core.

7. An improved retracting optical fiber connector comprising:
    a retractable housing having at least a first and a second position;
    a first connector member mounted within the retractable housing, wherein the first connector member comprises at least first and second optical waveguides, the first connector member being configured to directly engage a second connector member;
    the second connector member comprising at least first and second optical waveguides, wherein the first and second waveguides of the second connector member are spaced apart congruently with respect to the first and second waveguides of the first connector member so that the respective waveguides of the first and second connector members engage optically when the first and second connector members are engaged; and
    an optical bypass device connected to the interior of the retractable housing, wherein the optical bypass device comprises:
        (a) an optical input;
        (b) an optical output; and
        (c) an optical waveguiding region optically connecting the optical input and the optical output;
    wherein when the first and second connector members are not engaged, the retractable housing is in the first position such that the optical bypass device redirects an optical beam traveling through the first waveguide of the first connector member to the second waveguide of the first connector member, and wherein when the first and second connector members are engaged, the retractable housing is in the second position such that an optical beam traveling through one of the waveguides of the first or second connector members is not redirected by the optical bypass device.

8. The retractable optical fiber connector of claim 7 where the optical waveguiding region of the bypass device comprises a plurality of reflective surfaces.

9. The retractable optical fiber connector of claim 7 wherein the optical waveguiding region of the bypass device comprises a core of optically suitable material and at least a first layer of cladding, where the relationship between the refractive index of the core and the refractive index of the cladding is such that an optical signal may be guided by the core.

10. The retracting optical fiber connector of claim 7 further comprising vee-grooves, wherein the bypass device is configured to be received by the vee-grooves.

* * * * *